US 6,475,655 B1

(12) United States Patent
Nakanishi et al.

(10) Patent No.: US 6,475,655 B1
(45) Date of Patent: Nov. 5, 2002

(54) FUEL CELL SYSTEM WITH HYDROGEN GAS SEPARATION

(75) Inventors: Haruyuki Nakanishi, Osaka (JP); Hirohisa Tanaka, Osaka (JP); Koji Yamada, Osaka (JP); Masahiro Abe, Osaka (JP); Koichiro Asazawa, Osaka (JP)

(73) Assignee: Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 09/597,397

(22) Filed: Jun. 21, 2000

(30) Foreign Application Priority Data

| Jun. 23, 1999 | (JP) | 11-177033 |
| Jul. 6, 1999 | (JP) | 11-191357 |
| Sep. 14, 1999 | (JP) | 11-260306 |
| Sep. 24, 1999 | (JP) | 11-270001 |
| Sep. 27, 1999 | (JP) | 11-272857 |
| Sep. 30, 1999 | (JP) | 11-280104 |

(51) Int. Cl.$^7$ .............................................. H01M 8/18
(52) U.S. Cl. ............................. 429/19; 429/12; 429/13; 429/17; 429/22; 429/30; 429/34; 429/35; 429/37; 429/38; 429/64
(58) Field of Search ..................... 429/12, 13, 17, 429/19, 22, 30, 34, 35, 37, 38, 64

(56) References Cited

U.S. PATENT DOCUMENTS

| 4,200,062 A | * | 4/1980 | Duckworth | 123/1 A |
| 4,654,047 A | * | 3/1987 | Hopkins et al. | 62/23 |
| 4,810,485 A | * | 3/1989 | Marianowski et al. | 423/648 |
| 4,927,857 A | * | 5/1990 | McShea, III et al. | 518/703 |
| 4,997,727 A | * | 3/1991 | Bossel | 429/33 |
| 5,252,410 A | * | 10/1993 | Wilkinson et al. | 429/33 |
| 5,678,410 A | * | 10/1997 | Fujita et al. | 62/7 |
| 6,099,983 A | * | 8/2000 | Nakagaki et al. | 429/13 |
| 6,117,579 A | * | 9/2000 | Gyoten et al. | 429/30 |
| 6,120,923 A | * | 9/2000 | Van Dine et al. | 429/17 |
| 6,221,117 B1 | * | 4/2001 | Edlund et al. | 48/76 |
| 6,232,006 B1 | * | 5/2001 | Breault | 429/26 |

FOREIGN PATENT DOCUMENTS

| DE | 69017871 | 12/1990 |
| DE | 3537527 | 6/1992 |
| DE | 4423587 | 1/1996 |
| DE | 19734634 | 8/1997 |
| DE | 19738513 | 9/1997 |
| DE | 19646486 | 5/1998 |
| DE | 19827879 | 6/1998 |
| DE | 19920517 | 5/1999 |
| DE | 19804286 | 8/1999 |
| DE | 19817534 | 10/1999 |
| DE | 19907796 | 2/2000 |
| JP | 62-162601 | 7/1987 |
| JP | 5-82149 | 4/1993 |
| JP | 8-293312 | 4/1995 |

OTHER PUBLICATIONS

German Search Report, Feb. 8, 2001, 4 pages.

\* cited by examiner

Primary Examiner—Carol Chaney
Assistant Examiner—Dah Wei Yuan
(74) Attorney, Agent, or Firm—Merchant & Gould PC

(57) ABSTRACT

A fuel cell system includes a reforming device for producing a hydrogen-rich gas mixture by reforming a hydrogen-containing compound, and a fuel cell stack for generating electromotive fore by a reaction between hydrogen and oxygen. The fuel cell system further includes a hydrogen separating device disposed between the reforming device and the fuel cell stack. The hydrogen separating device is provided with hydrogen permeating means for obtaining a fuel gas by separating hydrogen gas from the gas mixture.

21 Claims, 30 Drawing Sheets

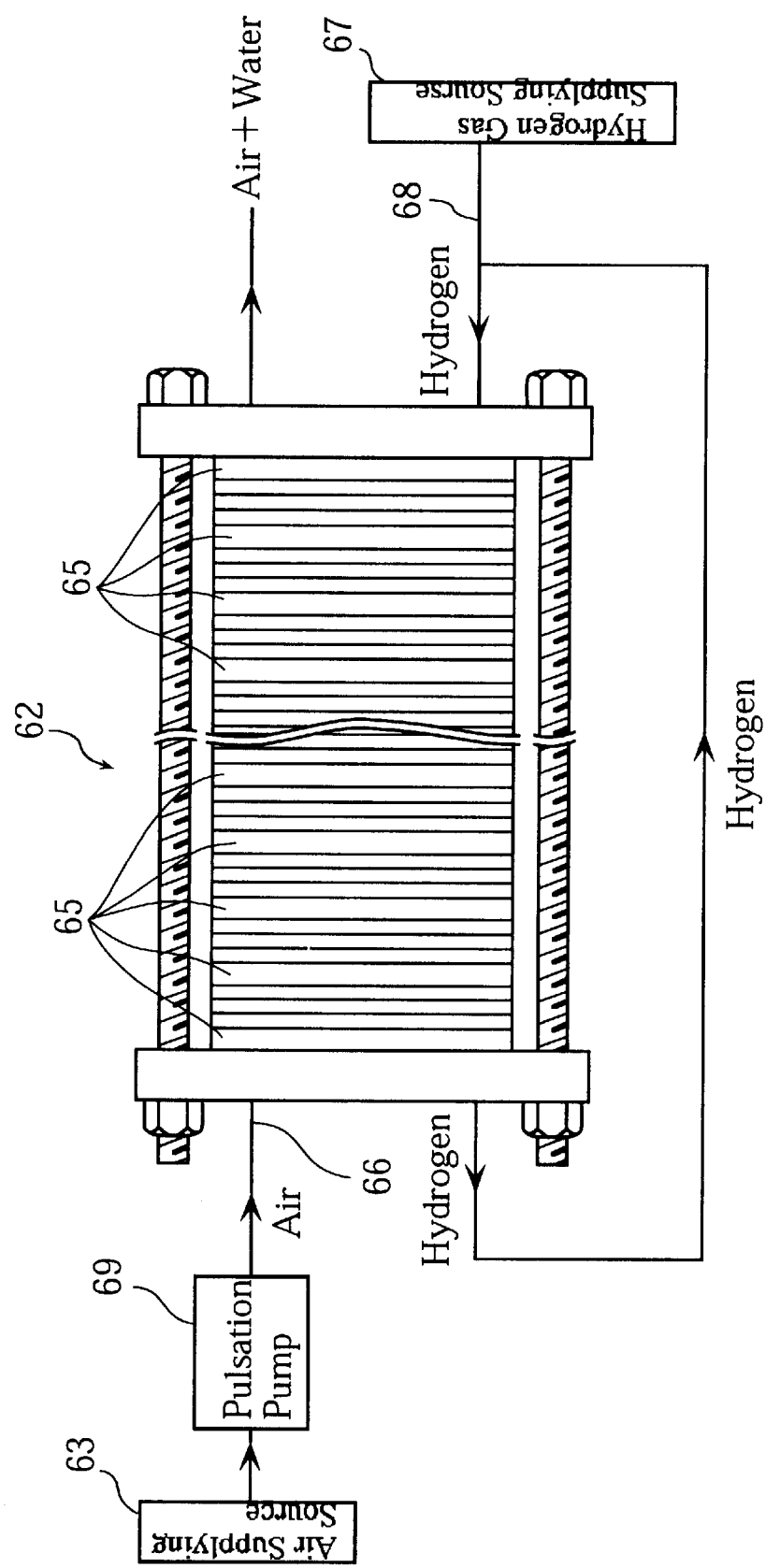

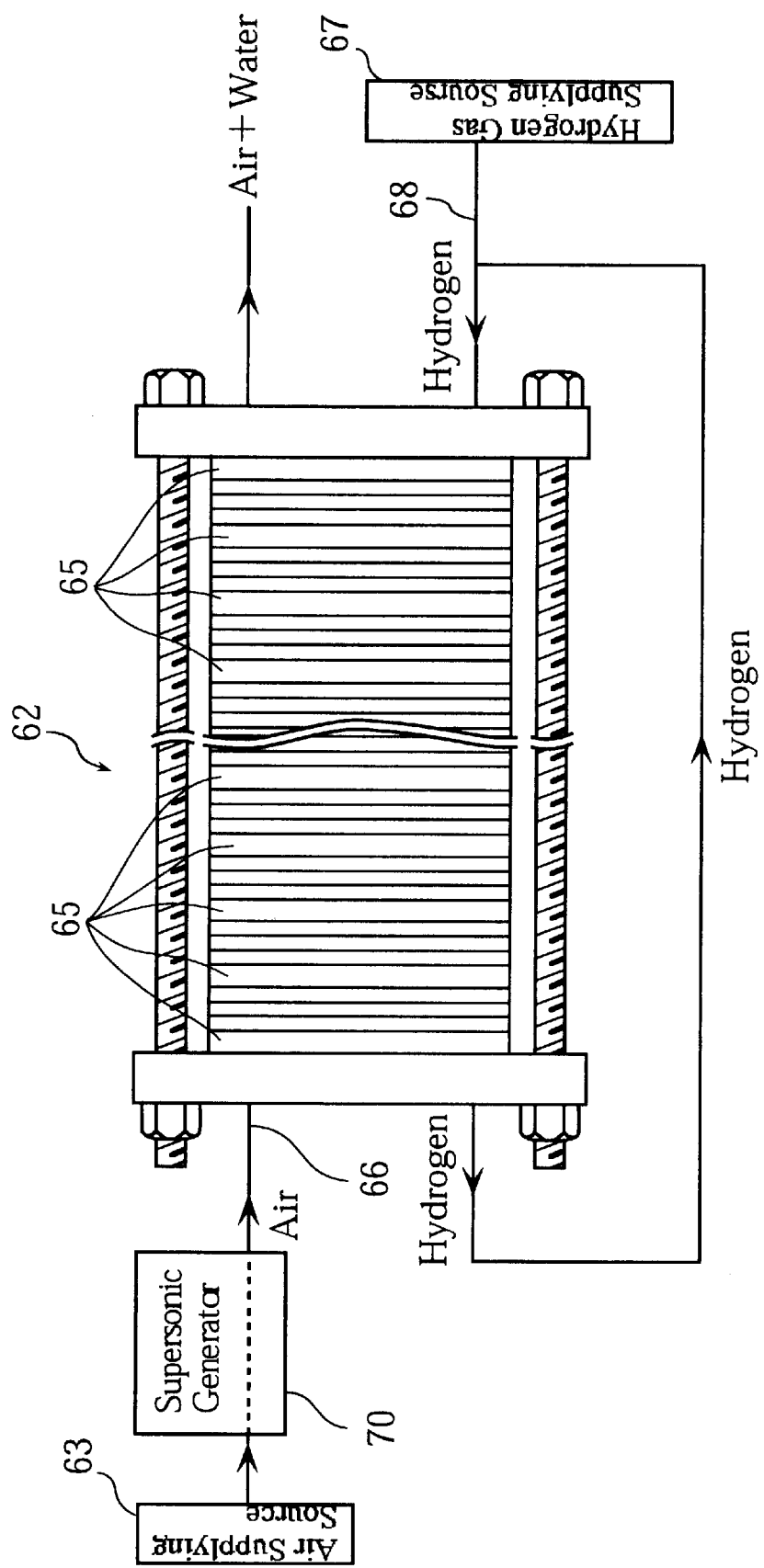

FUEL CELL SYSTEM WITH HYDROGEN GAS SEPARATION

BACKGROUND OF THE INVENTION

1. Field of the Invention

The present invention relates to a fuel cell system for generation of electric energy by reaction between a hydrogen-rich fuel gas and oxygen gas.

2. Description of Related Art

As is widely known, a fuel cell is continuously supplied with a fuel (hydrogen) and an oxidizing agent (oxygen) from outside of the fuel cell when generating electricity. The fuel is supplied to a negative electrode side whereas the oxidizing agent is supplied to a positive electrode side of the cell. The positive electrode and the negative electrode are separated from each other by an electrolytic member. The fuel cell converts chemical energy generated in oxidization of the supplied fuel directly into electric energy, serving as an electric power source.

An operating principle of the fuel cell is as follows: First, the hydrogen supplied as the negative-electrode active agent dissociates into electrons and protons. In order to promote the dissociation, platinum (Pt) for example is used as a catalyzer. After the dissociation, the protons pass the electrolyte of the fuel cell, and react with the supplied oxygen (positive-electrode active agent). The reaction yields water. On the other hand, the electrons resulted from the dissociation moves from the negative electrode to the positive electrode, generating electromotive force between the two electrodes.

The fuel cell directly converts chemical energy into electric energy. In this method, higher conversion efficiency can be expected than in a thermal generation method. For this reason, the fuel cell can be utilized effectively as a power source for a drive motor of an electric car for example. Further, exhaust from the fuel cell is mainly water vapor, which is not toxic like carbon monoxide contained in exhaust from an internal combustion engine.

Normally, the fuel cell does not function by itself as a source of electric supply. In order for the fuel cell to operate, means for supplying hydrogen gas to the fuel cell and other peripheral devices must be deployed. In other words, the fuel cell is part of a fuel cell system further comprising other peripheral devices, and operates within this system. The means for supplying the fuel cell with hydrogen may be pressure feeding from a high-pressure container loaded with hydrogen, or pressure feeding of hydrogen gas obtained by reforming a hydrogen-containing substance. Using the hydrogen gas stored in the high-pressure container can relatively simplify the system, and has a number of other advantages. On the contrary, a very high pressure and a long time are required for charging the container with hydrogen. Another problem is that a specific infrastructure such as a gas charge station network has to be prepared. These problems have been a major hurdle for making practical an electric automobile powered by the fuel cell.

The above problem can be solved by the feeding of hydrogen gas obtained by reforming a hydrogen-containing compound (such as methanol). Publicly known examples of this method include contacting the hydrogen-containing compound with steam, and oxidizing part of the hydrogen-containing compound. In these methods, the reformation of the hydrogen-containing compound leaves carbon dioxide and a trace quantity of carbon monoxide gas. Therefore, the desired hydrogen gas is obtained as a gas mixture containing these carbon dioxide and carbon monoxide gases.

If the platinum is used as the catalyzer for the negative electrode, the carbon monoxide contained in the gas mixture is problematic in the following point: As is widely known, platinum is poisoned by carbon monoxide gas, and gradually deteriorates in its activity. Therefore, if the hydrogen gas is supplied to the fuel cell as the gas mixture containing the carbon monoxide gas, life of the platinum catalyzer is shortened.

The poisoning of the platinum can be eliminated by converting the carbon monoxide gas in the gas mixture into carbon dioxide gas, and then supplying this modified gas mixture to the fuel cell. Generally, a multi-stage conversion method is used in which the carbon monoxide is first oxidized at a high temperature, and then residual carbon monoxide is oxidized at a low temperature.

However, the fuel cell does not consume all of the supplied hydrogen gas for the generation of electricity. Part of the hydrogen gas is discharged out of the fuel cell as non-reacted gas. In an attempt to effectively use this non-reacted hydrogen gas, methods of recycling the discharged gas mixture (containing the non-reacted hydrogen gas and the carbon dioxide gas) from the fuel cell back into the fuel cell are being tried conventionally. However, concentration of the non-reacted hydrogen gas in the recycled gas mixture is lower than in the gas mixture originally supplied to the fuel cell. Therefore, in the method of reforming a hydrogen-containing compound in which obtained hydrogen gas is low in purity, repeated recycling of the gas mixture will enrich gases other than the hydrogen gas (such as carbon dioxide), unjustifiably decreasing energy conversion efficiency.

DISCLOSURE OF THE INVENTION

The present invention is proposed under the circumstances described above. An object of the present invention is to minimize the decrease in energy conversion efficiency of the overall fuel cell system, in a fuel cell system which generates electricity by using a gas mixture discharged from the fuel cell. Another object of the present invention is to provide a fuel cell stack suitably used in the above fuel cell system.

A fuel cell system provided by a first aspect of the present invention comprises a reforming device for producing a hydrogen-rich gas mixture by reforming a hydrogen-containing compound; a fuel cell for generating electromotive force by a reaction between hydrogen and oxygen; and further a hydrogen separating device disposed between the reforming device and the fuel cell. The hydrogen separating device is provided with hydrogen permeating means for obtaining a fuel gas by separating hydrogen gas from the gas mixture.

Preferably, the fuel cell system further comprises circulating means for supplying non-reacted gas discharged from the fuel cell, to the fuel cell as fuel gas.

The hydrogen-containing compound is one of ethanol, methanol, dimethyl ether, propane and natural gas.

The hydrogen permeating means may include a palladium alloy film. The palladium alloy film can be made of an alloy including palladium and at least one metal selected from silver, gold and ruthenium.

The hydrogen permeating means may include solid high-polymer hollow yarn. The solid high-polymer hollow yarn is made of polyimide for example.

The reforming device may include a steam generating portion for vaporization of water by heating, a combusting portion for heating the steam generating portion by burning a predetermined fuel, and a reforming portion for producing the hydrogen-rich gas mixture by reacting steam generated by the steam generating portion with the hydrogen-containing compound. The gas mixture from which hydrogen is separated by the hydrogen separating device can be used by the combusting portion as a fuel.

The fuel cell system may comprise a fuel cell stack including the fuel cell and at least an additional fuel cell laminated on the fuel cell.

A fuel cell system provided by a second aspect of the present invention comprises a plurality of fuel cell stacks each including a plurality of fuel cells in lamination, supply means for supplying a fuel and an oxidizing agent to each of the fuel cell stacks, and operation control means for controlling operation of the fuel cell stacks. The fuel cell stacks are divided into a plurality of groups including at least a first and a second groups, and the operation control means is arranged to operate and stop the fuel cell stacks of the first group independently of the fuel cell stacks of the second group.

Preferably, the operation control means is arranged to operate and stop each of the plurality of fuel cell stacks independently of the other fuel cell stacks.

Preferably, the fuel cell system further comprises piping for supplying the fuel to each of the fuel cell stacks, and a plurality of valves provided on the piping. The valves are arranged to supply and to stop the supply of the fuel to fuel cell stacks. Each of the valves is provided correspondingly to one of the plurality of groups.

Preferably, the operation control means controls open/close operation of the plurality of valves in accordance with an amount of electricity needed.

Preferably, the fuel cell system further comprises output control means provided with at least a pair of output terminals for receiving electricity from the fuel cell stacks and for outputting the electricity to an external component. The output control means is arranged to change a mutual connecting pattern among the fuel cell stacks, and a connecting pattern of the fuel cell stacks to the output terminals.

An automobile provided by a third aspect of the present invention comprises a drive motor and a fuel cell system for supplying electricity to the drive motor. The fuel cell system includes a plurality of fuel cell stacks each including a plurality of fuel cells in lamination, means for supplying a fuel and an oxidizing agent to each of the fuel cell stacks, and drive control means for controlling operation of the fuel cell stacks. The fuel cell stacks are divided into a plurality of groups including at least a first and a second groups. The drive control means is arranged to operate and stop the fuel cell stacks of the first group independently of the fuel cell stacks of the second group.

A fuel cell system provided by a fourth aspect of the present invention comprises a reforming device for producing a hydrogen-rich fuel-gas mixture by reforming dimethyl ether, and a fuel cell supplied with the fuel gas and an oxygen-containing gas, thereby causing a reaction between hydrogen gas and oxygen gas to produce electric energy and water. The reforming device includes a steam generating portion for vaporization of water, and a fuel reforming portion for performing steam reformation of the dimethyl ether. The dimethyl ether is heated, before being introduced into the fuel reforming portion, by heat generated at the steam generating portion.

At the fuel reforming portion, dimethyl ether is reformed into hydrogen and carbon dioxide by steam. Examples of a catalyzer disposed in the fuel reforming portion for promoting the reformation include Cu, for example, supported by an oxide of a base metal, a mixed (composite) oxide including one or more of Cr, Mn, Fe, Ni, Cu and Zn, and the mixed oxide supported by a heat-resistant support.

The fuel cell system further comprises a thermally conductive hollow member disposed in the steam generating portion. The dimethyl ether is introduced into the fuel reforming portion via the hollow member.

A fuel cell system provided by a fifth aspect of the present invention comprises a fuel cell, a hydrogen supplying source for supplying hydrogen gas to the fuel cell, and an oxygen-containing-gas supplying source for supplying an oxygen-containing gas to the fuel cell. The fuel cell system further comprises a water removing means for intermittently promoting removal of water remaining in the fuel cell.

Preferably, the water removing means is an electromagnetic valve provided between the oxygen-containing-gas supplying source and the fuel cell. Alternatively, the water removing means may be a pulsation pump provided between the oxygen-containing-gas supplying source and the fuel cell. Alternatively, the water removing means may be a supersonic generator.

The fuel cell includes a negative-electrode portion, a positive-electrode portion, an electrolyte portion disposed between the negative-electrode portion and the positive-electrode portion, a first plate disposed adjacent to the negative-electrode portion, and a second plate disposed adjacent to the positive-electrode portion. The first plate is provided with a hydrogen supplying groove for supplying the hydrogen gas to the negative electrode-portion. The second plate is provided with an oxygen supplying groove for supplying the oxygen-containing gas to the positive-electrode portion.

Each of the positive-electrode portion and the negative-electrode portion may include a catalyzer layer and a collector as a separate member from the catalyzer layer. In this case, the catalyzer layer is, for example, a porous member supporting a catalyzer. If the electrolyte portion is a solid member, the catalyzer layer may be formed by directly applying the catalyzer to a surface of the electrolyte.

Each of the positive-electrode portion and the negative-electrode portion may be an integration of the catalyzer layer and the collector.

According to a sixth aspect of the present invention, there is provided a method for removing unnecessary water remaining in a fuel cell supplied with a fuel gas and an oxygen-containing gas. The method comprises a step of supplying the oxygen-containing gas into the fuel cell, and a step of intermittently varying a pressure of the oxygen-containing gas.

Preferably, the pressure of the oxygen-containing gas is momentarily raised.

According to a seventh aspect of the present invention, there is provided a method for removing unnecessary water remaining in a fuel cell supplied with a fuel gas and an oxygen-containing gas. The method comprises a step of supplying the oxygen-containing gas into the fuel cell, and a step of applying high frequency vibration to the remaining water.

A fuel cell provided by an eighth aspect of the present invention comprises a negative-electrode portion for breaking hydrogen gas into hydrogen ions and electrons; a positive-electrode portion for producing water by a reaction of the hydrogen ions, electrons and oxygen gas; an electrolyte portion disposed between the negative-electrode portion and the positive-electrode portion in a manner allowing passage of hydrogen ions; a first plate disposed adjacent to the negative-electrode portion and provided with a hydrogen supplying groove for supplying the hydrogen gas to the negative-electrode portion; and a second plate disposed adjacent to the positive-electrode portion and provided with an oxygen supplying groove for supplying an oxygen-containing gas to the positive-electrode portion. At least one of the oxygen supplying groove and the hydrogen supplying groove is formed with a plurality of projections.

Preferably, the projections are provided with slopes for directing a flow of the supplied gas toward the electrolyte portion.

A fuel cell provided by a ninth aspect of the present invention comprises at least one electrode portion having a first surface and a second surface, an electrolyte portion adjacent to the first surface, and aplate adjacent to the second surface and formed with a gas supplying groove for supply of a predetermined gas. The gas supply groove is provided with a surface-pressure assuring means for assuring a surface pressure to the electrode portion.

Preferably, the plate is provided with a through hole communicating with the gas supplying groove. The surface-pressure assuring means is disposed near the through hole.

The surface-pressure assuring means includes a hollow member, and the hollow member has a thickness substantially equal to a depth of the gas supplying groove. Alternatively, the surface-pressure assuring means includes a gas-permeable porous member, and the porous member has a thickness substantially equal to a depth of the gas supplying groove.

The gas supplying groove may be provided with a stepped portion for supporting the surface-pressure assuring means.

According to the tenth aspect of the present invention, there is provided a plate-like separator used in a fuel cell stack comprising laminated fuel cells. The separator comprises a through hole for allowing passage of a supplied gas, a gas supplying groove communicating with the through hole, and a surface-pressure assuring means disposed in the gas supplying groove. The surface-pressure assuring means is placed near the through hole.

Other characteristics and advantages of the present invention will become clearer from detailed description to be made hereinafter with reference to the attached drawings.

BRIEF DESCRIPTION OF THE ATTACHED DRAWINGS

FIG. 31 is a diagram illustrating another method for discharging unnecessary water stagnating within the fuel cell stack.

FIG. 32 is a diagram illustrating still another method for discharging unnecessary water stagnating within the fuel cell stack.

DETAILED DESCRIPTION OF PREFERRED EMBODIMENTS

Hereinafter, preferred embodiments of the present invention will be described specifically with reference to the attached drawings.

Figure 1:
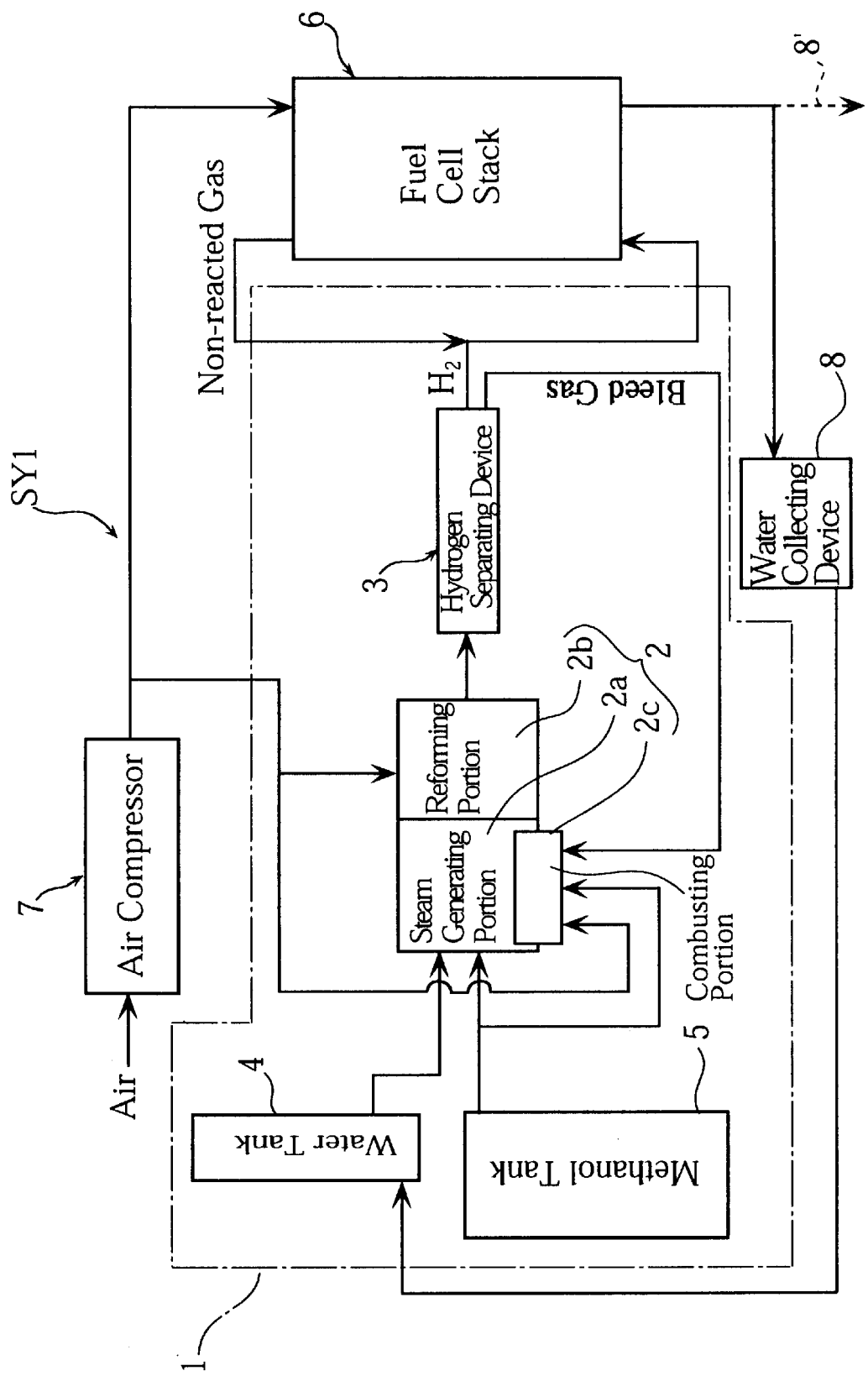
FIG. 1 is a block diagram outlining a constitution of a fuel cell system according to a first embodiment of the present invention.

First, reference is made to FIG. 1. This figure is a block diagram showing a fuel cell system SY1 according to a first embodiment of the present invention.

The illustrated system SY1 comprises a hydrogen gas supplying source 1. The hydrogen gas supplying source 1 basically includes a reforming device 2, a hydrogen separating device 3, a water tank 4, and a methanol tank 5. In addition to the hydrogen gas supplying source 1, the system SY1 further comprises a fuel cell stack 6, an air compressor 7, and a water collecting device 8.

The reforming device 2 of the hydrogen gas supplying source 1 is provided, in order to reform methanol (a hydrogen-containing compound) supplied from the methanol tank 5 into a hydrogen-rich gas mixture. For this object, the reforming device 2 is provided with a steam generating portion 2a, a reforming portion 2b, and a combusting portion 2c.

According to the embodiment shown in FIG. 1, methanol is used as the hydrogen-containing compound. However, this does not limit the present invention: Specifically, the hydrogen-containing compound may be either one of an organic compound and an inorganic compound. Examples of the suitably usable organic compound include hydrocarbon, as well as natural gas and petrol, which are primarily made of hydrocarbon. Other examples of the organic compound are derivatives derived from hydrocarbon by substituting some hydrogen atoms with a functional group (such as oxygen functional group, nitrogen functional group, and sulfur functional group). Alcohol, phenol, aldehyde, carboxylic acid, ketone, ether and so on are derivatives derived by substitution with the oxygen functional group. Derivatives derived by substitution with the nitrogen functional group include nitro compounds and amine. Derivatives derived by substitution with the sulfur functional group include thiol, sulfonic acids and so on. On the other hand, examples of the inorganic compound may be carbonic acid, ammonia, and hydrazine. With energy efficiency of the overall system taken into consideration, it is preferable to use a compound reformable by a relatively low energy (low temperature). Other requirements include high level of safety, good stable supply in industrial level, and easiness in handling. For these reasons, methanol, dimethyl ether, propane, methane, and natural gas are suitable as the material for the reformation.

The steam generating portion 2a of the reforming device 2 is supplied with water and methanol, from the water tank 4 and the methanol tank 5 respectively. The supplied water and methanol are heated by the combusting portion 2c. As a result, the water turns into steam whereas the methanol is heated to a temperature suitable for the reformation. The combusting portion 2c is provided with a burner or a combustion catalyzer, which causes combustion of the methanol supplied from the methanol tank 5 and air supplied from the air compressor 7 in the combusting portion 2c. Further, the combusting portion 2c is supplied with a bleed gas (to be described later) from the hydrogen separating device 3. The bleed gas also is used for the combustion in the combusting portion 2c.

The steam obtained in the steam generating portion 2a is supplied, together with the methanol heated by the combusting portion 2c, to the reforming portion 2b. The reforming portion 2b is further supplied with air from the air compressor 7. The reforming portion 2b is loaded therein with a suitable catalyzer (such as a Cu—Zn catalyzer or a Pt catalyzer) held by a metal net, a honeycomb support, and so on. With promotion by the catalyzer, methanol is reformed and hydrogen gas is obtained. Specifically, as shown in the following reaction formulae (1) and (2), a reaction between methanol and steam (steam reforming reaction) and a reaction (partial oxidization reaction) between methanol and air (oxygen-containing gas) yield the hydrogen gas. It should be noted here that out of these two reactions, the reaction represented by the formula (1) is the dominating reaction.

$$CH_3OH + H_2O \rightarrow 3H_2 + CO_2 \tag{1}$$

$$CH_3OH + 1/2O_2 \rightarrow 2H_2 + CO_2 \tag{2}$$

As is clear from the above reaction formulae (1) and (2), the steam reforming reaction, as well as the partial oxidization reaction, will leave carbon dioxide in addition to the hydrogen gas. Further, the reactions will also leave carbon monoxide if the oxidization is not sufficient. Still further, not all of the supplied methanol is reformed. As a result, the reforming portion 2b yields a hydrogen-rich gas mixture containing carbon dioxide, carbon monoxide and methanol.

The gas mixture is supplied to the hydrogen separating device 3. The hydrogen separating device 3 is provided with hydrogen permeating means. Therefore, a fuel gas containing hydrogen at an extremely high level of concentration can be obtained. Examples of the hydrogen permeating means include a hydrogen-permeable film supported on a porous member formed into a spiral, and a tube provided with a plurality of tubular film or a bundle of hollow yarns. The hydrogen-permeable film is available as a product made of a metal having a high capacity of hydrogen occlusion, or a product made of a polymeric material.

Here, examples of the metal having a high capacity of hydrogen occlusion include palladium and palladium alloys. The palladium alloys includes a number of publicly known compositions, with examples being alloys comprising palladium (Pd) and at least one of the metals selected from a metal group of silver (Ag), Gold (Au), and Ruthenium (Ru). Specifically, a Pd—Ag alloy, a Pd—Ag—Au alloy, a Pd—Ag—Au—Ru alloy and so on can be used suitably. Preferably, the Pd—Ag alloy should contain 20–30 wt % of silver. The Pd—Ag—Au alloy should contain 20–30 wt % of silver and 5–10 wt % of gold preferably, whereas the Pd—Ag—Au—Ru alloy should contain 20–30 wt % of silver, 5–10 wt % of gold and 1–5 wt % of ruthenium preferably.

The high-polymer hydrogen permeable film must be high in hydrogen permeability and in hydrogen separability, and therefore should be made of a rigid amorphous polymer having a high glass-transition temperature and a high dimensional (three dimensional) structure having gaps selectively allowing passage of molecules and atoms of a size of a hydrogen molecule. Examples of the suitable material are cellulose acetate, polysulfone, polyimide, and polyamide, with polyimide being a particular preference. When there is a pressure difference between two sides of the high-polymer hydrogen permeable film, only hydrogen molecules are selectively allowed to pass the film, and separated.

For each of the metal and high-polymer hydrogen-permeable films, a form of the film may be a flat film, hollow yarn, or tubular.

Figure 2A:
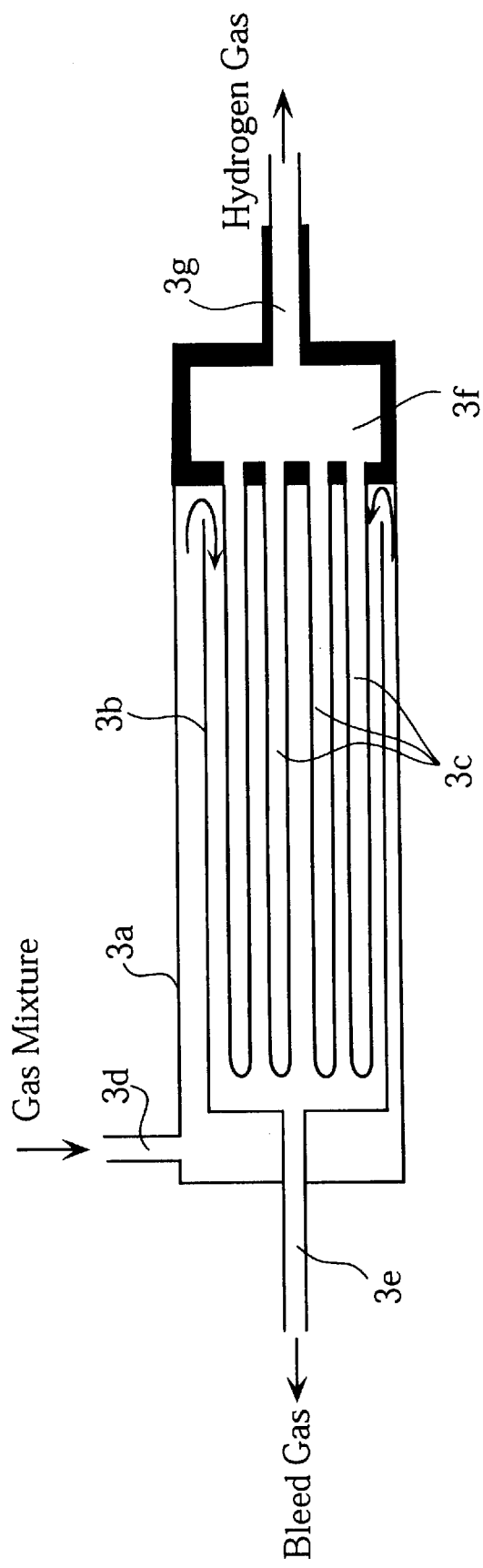
FIG. 2A and FIG. 2B are diagrams illustrating a hydrogen separating device of the fuel cell system.
Figure 2B:
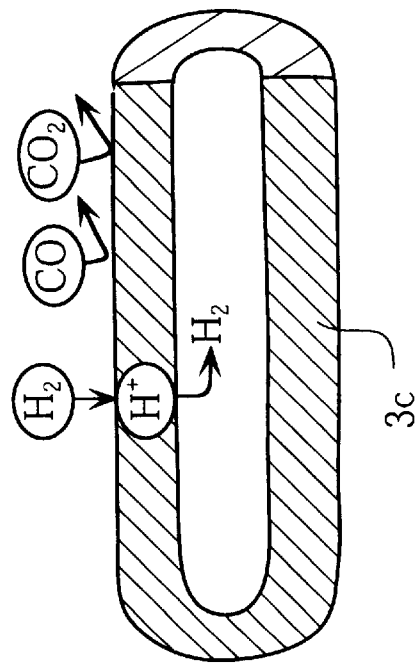
Figure 3A:
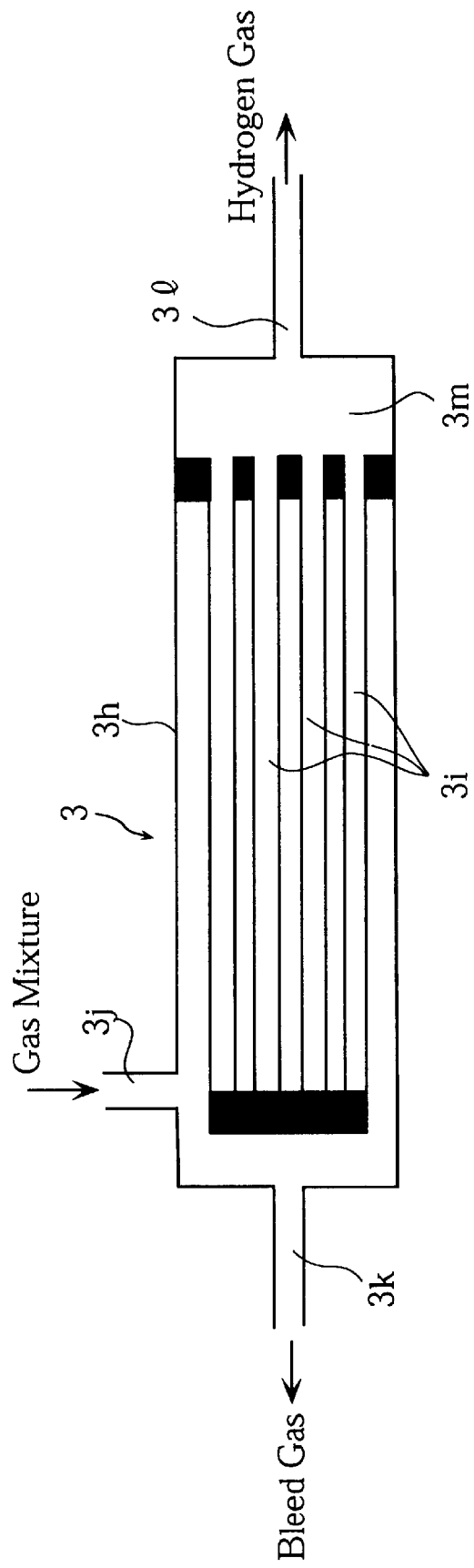
FIG. 3A and FIG. 3B are diagrams illustrating another example of the hydrogen separating device used in the fuel cell system.
Figure 3B:
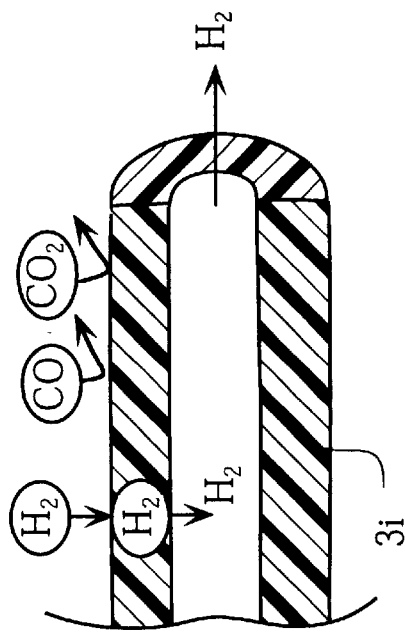

FIG. 2A and FIG. 2B show a constitution example of a hydrogen separating device 3 which uses the palladium alloy film. On the other hand, FIG. 3A and FIG. 3B show a constitution example of a hydrogen separating device 3 which uses the solid high-polymer hollow yarn film.

In the hydrogen separating device 3 shown in FIG. 2A, a first tube 3a houses a second tube 3b. The second tube 3b houses a plurality of palladium alloy tubes 3c. The first tube 3a is provided with a supply port 3d for supplying the gas mixture. The second tube 3b is provided with a first discharge port 3e for discharging the bleed gas. Each of the palladium alloy tubes 3c has one end closed whereas the other end is open to a space chamber 3f. The space chamber $3f$ is provided with a second discharge port $3g$ for discharging the hydrogen gas.

With the above arrangement, the gas mixture supplied from the supply port $3d$ is introduced into the second tube $3b$. Then, only hydrogen gas in the gas mixture reaches inside of the palladium alloy tubes $3c$, whereas the other gas components are discharged as the bleed gas from the first discharge port $3e$ of the second tube $3b$.

As shown in FIG. 2B, hydrogen molecules adsorb on a surface of the palladium alloy tube $3c$. Then, the hydrogen molecules dissociate into two hydrogen atoms. Each of the hydrogen atoms gives the electron to the palladium alloy tube $3c$ to become a hydrogen ion ($H^+$). The hydrogen ion passes through the palladium alloy film, and reaches inside of the palladium alloy tube $3c$ where there is a lower hydrogen partial pressure. Then, the hydrogen ion receives an electron from the palladium alloy tube $3c$ to become a hydrogen atom, and pairs with another hydrogen atom to become a hydrogen molecule. Thereafter, the hydrogen molecule is discharged from the second discharge port $3g$ (FIG. 2A). On the other hand, the other components such as carbon monoxide and carbon dioxide cannot pass through the palladium alloy film, and therefore discharged from the first discharge port $3e$.

In the hydrogen separating device 3 shown in FIG. 3A, a tube $3h$ houses a plurality of polyimide hollow yarns $3i$. The tube $3h$ is provided with a supply port $3j$ for supplying the gas mixture, a first discharge port $3k$ for discharging the bleed gas, and a second discharge port $3l$ for discharging the hydrogen gas. Each of the polyimide hollow yarns $32b$ has one end closed whereas the other end is open to a space chamber $3m$. The space chamber $3m$ communicates with the second discharge port $3l$.

With the above arrangement, as is clear from FIG. 3A, hydrogen gas mixture supplied from the supply port $3j$ reaches inside of the tubes $3h$, where each component of the gas mixture contacts the polyimide hollow yarns 31. However, components having a large molecular size, such as carbon monoxide and carbon dioxide, cannot pass through the polyimide hollow yarn $3i$, and are discharged as the bleed gas from the first discharge port $3k$ of the tube $3h$. As is clear from FIG. 3B, hydrogen molecules contacting the polyimide hollow yarn $3i$ passes through the polyimide hollow yarn $3i$ due to a small molecular size, and reaches inside of the polyimide hollow yarn $3i$. The hydrogen gas selectively separated as above is then discharged from the second discharge port $3l$.

As has been described, by using the hydrogen separating device 3 shown in FIG. 2A or FIG. 3A, only hydrogen molecules can be separated efficiently from the gas mixture. In other words, it becomes possible to increase hydrogen gas purity of the fuel gas obtained through the hydrogen separating device 3 to an extremely high level. The fuel gas thus obtained is then supplied to the fuel cell stack 6, whereas the bleed gas is supplied to the combusting portion $2c$ of the reforming device 2.

The fuel cell stack, to be described later in further detail, is a plurality of fuel cells laminated in series. Each of the fuel cells has a positive electrode portion, a negative electrode portion and an electrolyte portion. The negative electrode portion is supplied with the fuel gas from the hydrogen separating device 3. The positive electrode portion is supplied with air from the compressor 7. At the negative electrode portion, hydrogen gas in the fuel gas is dissociated into hydrogen ions and electrons as shown in the reaction formula (3). On the other hand, at the positive electrode portion, as shown in the reaction formula (4), oxygen gas in the air reacts with the electrons and the hydrogen ions coming through the electrolyte portion, to produce water.

$$H_2 \rightarrow 2H^+ + 2e^- \tag{3}$$

$$4H^+ + O_2 + 4e^- \rightarrow 2H_2O \tag{4}$$

Water produced at the positive electrode portion is sent to the water collecting device 8 together with air discharged from the fuel cell stack 6, and then stored in the water tank 4. It should be noted here that the water collecting device 8 will not become necessary if the water tank 4 is arranged to be timely replenished with water. In such a case, as shown by an arrow (broken line) 8' in FIG. 1, the water produced at the positive electrode portion may be discharged into the atmosphere together with the air discharged from the fuel cell stack 6.

As has been mentioned above, the hydrogen gas purity of the fuel gas supplied to the fuel cell stack 6 is extremely high. For this reason, the gas discharged from the fuel cell stack 6 also contains a large amount of non-reacted hydrogen gas. According to the present embodiment, as shown in FIG. 1, the gas discharged from the fuel cell 6 is supplied to the fuel cell stack 6, thereby making possible to use the non-reacted hydrogen gas at the fuel cell stack 6. Recycling means for this purpose is provided in the fuel cell system SY1. The recycling means includes pipes and other components constituting a return path for the non-reacted gas discharged from the fuel cell stack 6 to go back into the fuel cell stack 6. This makes possible to effectively use the non-reacted hydrogen gas.

According to the first embodiment of the present invention, the purity of the fuel gas supplied to the fuel cell stack 6 is very high. Therefore, the discharge gas from the fuel cell stack 6 can be reused at the fuel cell stack 6 without causing a problem, making possible to increase fuel gas utilization efficiency, and in particular, energy conversion efficiency of the hydrogen gas, advantageously.

Further, since the fuel cell stack 6 is supplied with the fuel gas having a high level of hydrogen gas purity, the problem of poisoned catalyzer in the fuel cell stack can be appropriately avoided.

Next, reference is made to FIGS. 4–8. These figures show a fuel cell system SY2 according to a second embodiment of the present invention. The fuel cell system SY2 differs from the fuel cell system SY1 (FIG. 1) in the provision of a plurality of fuel cell stacks 9.

In addition to the fuel cell stacks 9, the fuel cell system SY2 mainly comprises a hydrogen gas supplying source 10, hydrogen gas supply piping 11, hydrogen gas collection piping 12, air supply piping 13, air collection piping 14, a plurality of valves 15, an operation control portion 16, and an output control portion 17.

Similarly to the first embodiment, the hydrogen-gas supplying device 10 is provided with a device for separating hydrogen gas from a hydrogen-containing compound. However, differing from the first embodiment, the second embodiment does not use the method of collecting the discharged water from each of the fuel cell stacks 6 for supplying to the hydrogen gas supplying source 10. It should be noted here that instead of the device for separating hydrogen gas from a hydrogen-containing compound, the hydrogen gas supplying source 10 may include a high-pressure container charged with high-pressure hydrogen gas, a high-pressure container loaded with liquefied hydrogen, or a hydrogen occluding alloy storing an amount of hydrogen.

Figure 4:
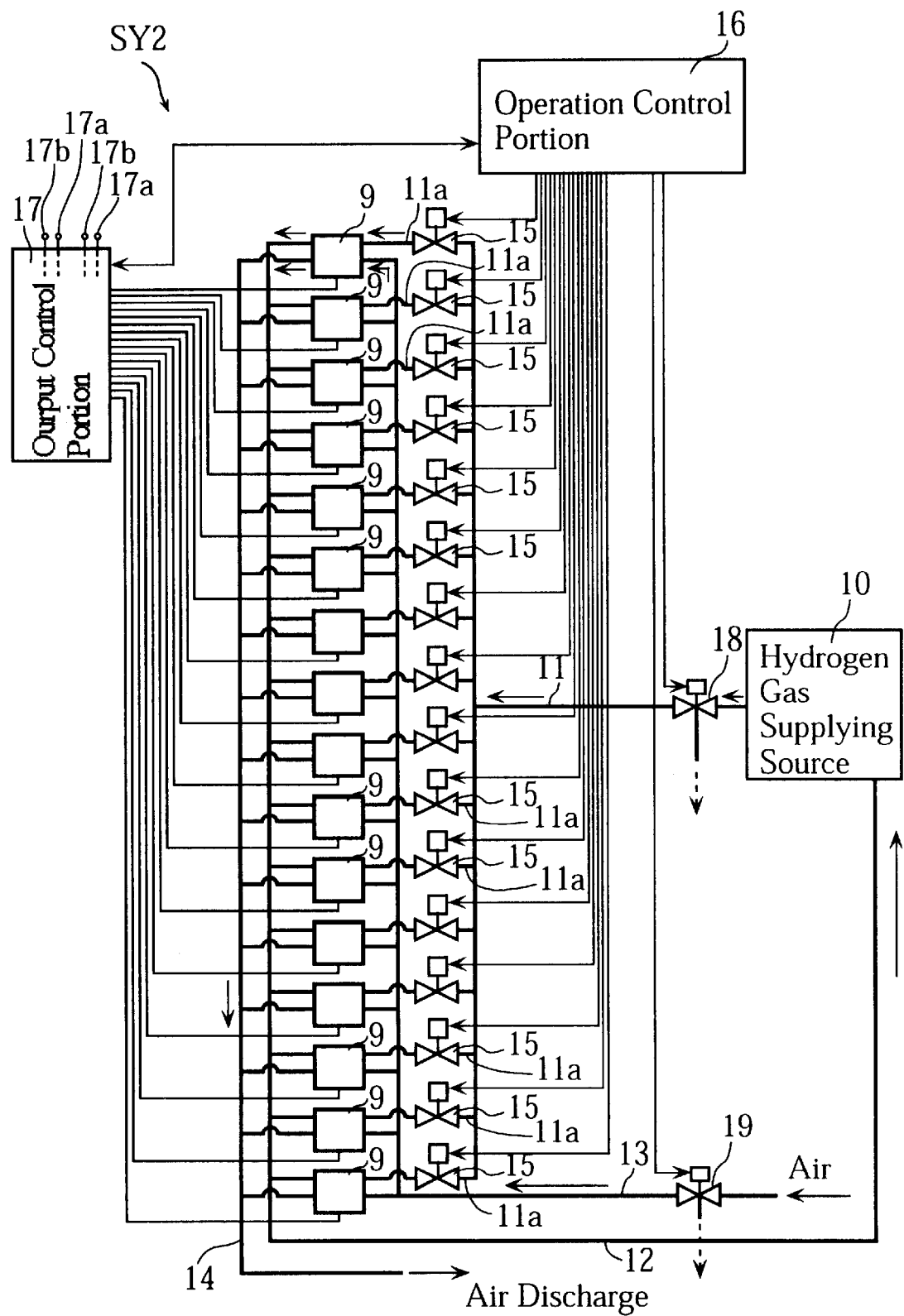
FIG. 4 is a diagram outlining a constitution of a fuel cell system according to a second embodiment of the present invention.

The hydrogen gas supply piping 11 is for supplying the hydrogen gas from the hydrogen gas supplying source 10 to each of the fuel cell stacks 9 (a total of 16 fuel cell stacks). As shown in FIG. 4, the hydrogen gas supply piping 11 has a plurality of branch pipes 11a each connected to one of the fuel cell stacks 9. The hydrogen gas supplying source 10 and each of the branch pipes 11a are connected by a main pipe provided with a valve 18. The valve 18 is a remotely controllable electromagnetic valve for example, controlled by the operation control portion 16 for stopping the supply of hydrogen gas to the fuel cell stacks 9, and for discharging the hydrogen gas into the atmosphere from within the hydrogen gas supply piping 11. The valve 18 is useful for an emergency shutdown of the operation of each of the fuel cell stacks 9 should there be so needed. The hydrogen gas collection piping 12 is for collecting non-reacted hydrogen gas discharged from each of the fuel cell stacks 9, from the hydrogen gas originally supplied to each of the fuel cell stacks 9. The hydrogen gas collection piping 12 is provided so that the collected hydrogen gas can be returned to the hydrogen gas supplying source 10 for reuse.

Each of the valves 15 is provided on one of the branch pipes 11a of the hydrogen gas supply piping 11. These valves 15, like the valve 18, are remotely controllable electromagnetic valves. As will be described later, each valve 15 can be opened/closed independently of the other valves 15. Each of the fuel cell stacks 9 is operable only when the corresponding valve 15 is open and the hydrogen gas is being supplied. Though not illustrated in the drawings, each of the branch pipes 11a is provided with a separate flow control valve for controlling an amount of hydrogen gas supplied to the fuel cell stack 9.

The air supply piping 13 is for supplying air from the air compressor or a blower to each of the fuel cell stacks 9, and has branch pipes similar to those of the hydrogen gas supply piping 11. The air supply piping 13 is also provided with a same valve 19 as the valve 18. The valve 19, controlled by the operation control portion 16, makes possible to discharge air from within the air supply piping 13 to outside. Further, preferably, like the hydrogen gas supply piping 11, each of the branch pipes of the air supply piping 13 is also provided with a flow control valve capable of controlling an amount of air supplied to the corresponding fuel cell stack 9. The air collection piping 14 is for collecting the air coming through from each of the fuel cell stack 9. The air collected by the air collecting piping 14 is discharged into the atmosphere for example.

The operation control portion 16 controls the open/close operation of the plurality of valves 15, thereby controlling the operation of each of the fuel cell stacks 9. The operation control portion 16 opens/closes the plurality of valves 15 in response to control commands transmitted from an external component. The operation control portion 16 may include arithmetic processing means provided with a CPU and a memory associated therewith. In such a case, it becomes possible to arithmetically determine which of the valves 15 should be opened/closed, in accordance with a predetermined program.

According to the present invention, the operation control portion 16 can be provided with a capability to monitor a voltage between the electrodes of each fuel cell stack 9. With this arrangement, it becomes possible to determine whether or not the fuel cell stacks 9 are operating appropriately. More specifically, if damage is caused in a fuel cell stack 9, this fuel cell stack 9 becomes unable to operate even if the hydrogen gas is supplied. The operation control portion 16 can detect such a case, and operate the corresponding valve 15, thereby stopping the supply of hydrogen to this particular fuel cell stack 9. This makes possible to appropriately avoid a situation in which the hydrogen gas leaks from the damaged fuel cell stack 9 for example.

The output control portion 17 has a plurality of output terminal pairs 17a, 17b. The electricity generated by the fuel cell stacks 9 is sent to the output control portion 17, and then outputted from the output terminals 17a, 17b. According to the present invention, the output control portion 17 can have only one pair of the output terminals 17a, 17b.

Figure 5:
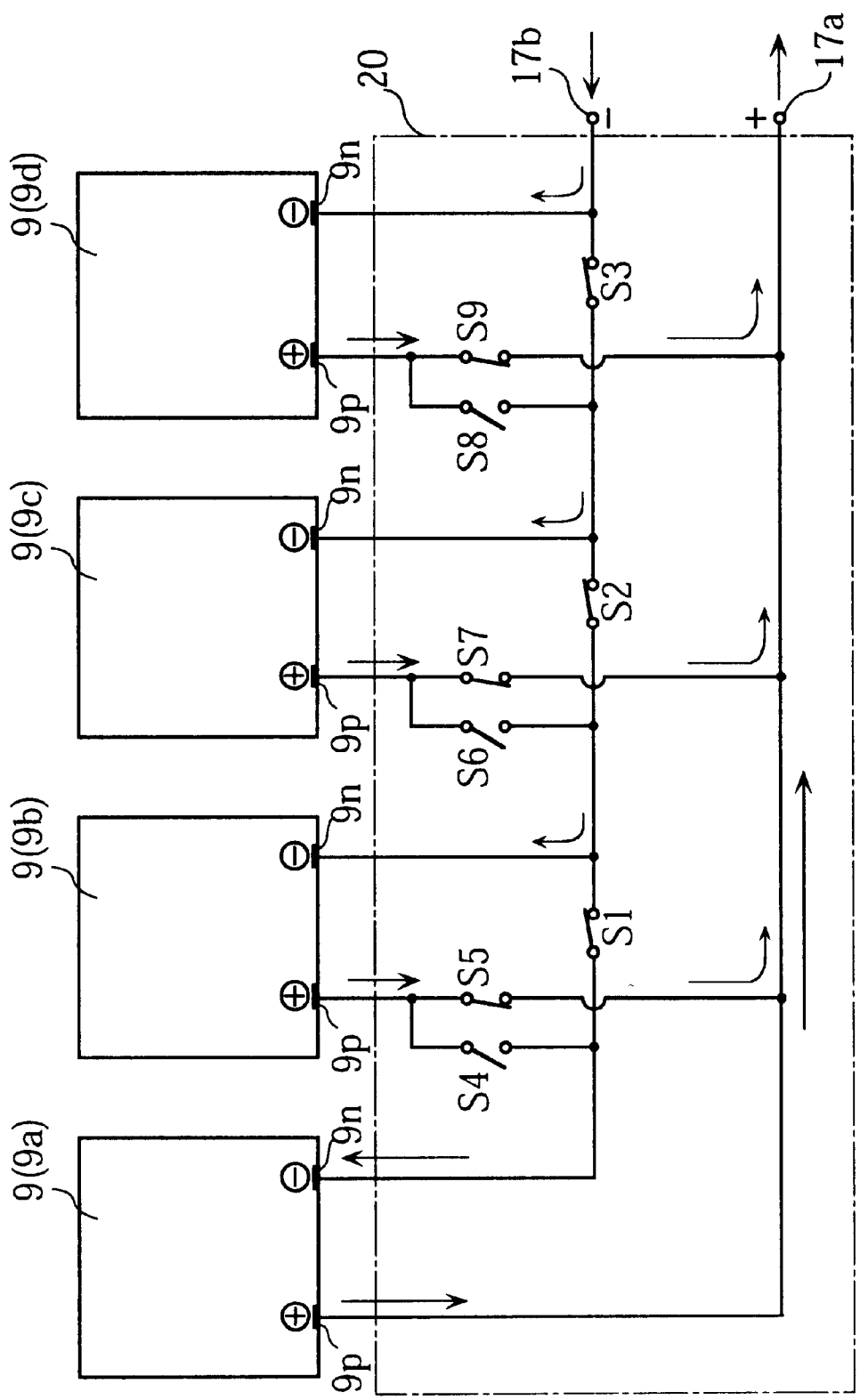
FIGS. 5–8 are diagrams showing electric circuitry of an output control portion used in the fuel cell system according to the second embodiment.

FIG. 5 shows a portion of electric circuit of the output control portion 17. For easier understanding, the figure shows an electric circuit 20 corresponding only to four fuel cell stacks 9 (9a–9d).

In the illustrated electric circuit 20, each positive electrode 9p of the fuel cell stacks 9a–9d is connected to the output terminal 17a, whereas each negative electrode 9n is connected to the output terminal 17b. A switch S1 is provided between the negative terminal 9n of the fuel cell stack 9a and the negative electrode 9n of the fuel cell stack 9b. Likewise, a switch S2 is provided between the negative electrode 9n of the fuel cell stack 9b and the negative electrode 9n of the fuel cell stack 9c, and a switch S3 is provided between the negative electrode 9n of the fuel cell stack 9c and the negative electrode 9n of the fuel cell stack 9d. Further, switches S5, S7, and S9 are provided between the output terminal 17a and the respective positive electrodes 9p of the fuel cell stacks 9b–9d. Further, each of the positive electrodes 9p of the fuel cell stacks 9b–9d can be connected to the negative output terminal 17b via corresponding one of switches S4, S6 and S8.

Figure 6:
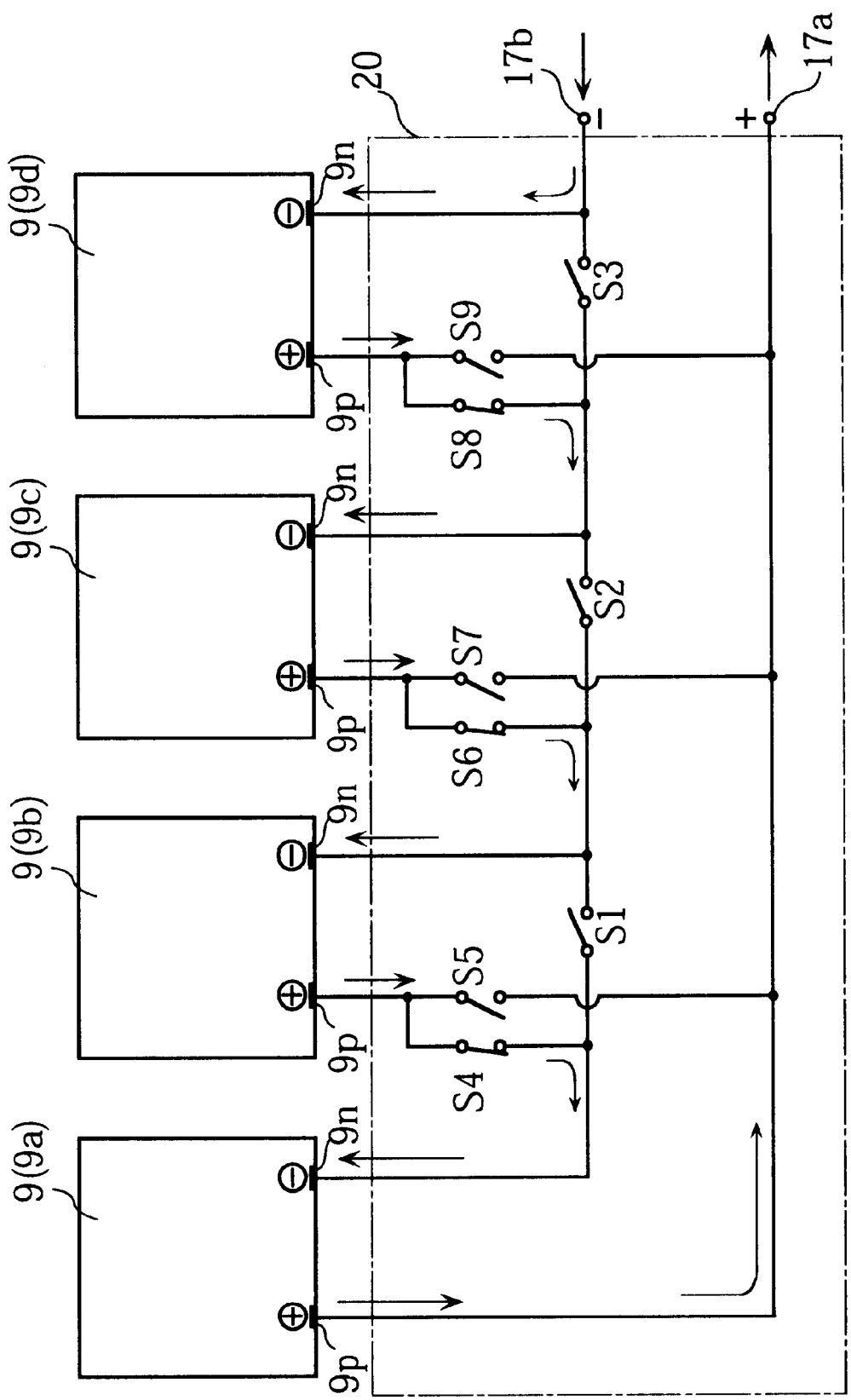

With the electric circuit 20 of the above arrangement, as shown in FIG. 5, the four fuel cell stacks 9a–9d can be connected in parallel to the pair of output terminals 17a, 17b, if the switches S1, S2, S3, S5, S7 and S9 are turned on whereas the switches S4, S6 and S8 are turned off. On the contrary, as shown in FIG. 6, the four fuel cell stacks 9a–9d can be connected in series to the pair of output terminals 17a, 17b, if the switches S1, S2, S3, S5, S7 and S9 are turned off whereas the switches S4, S6 and S8 are turned on.

Figure 7:
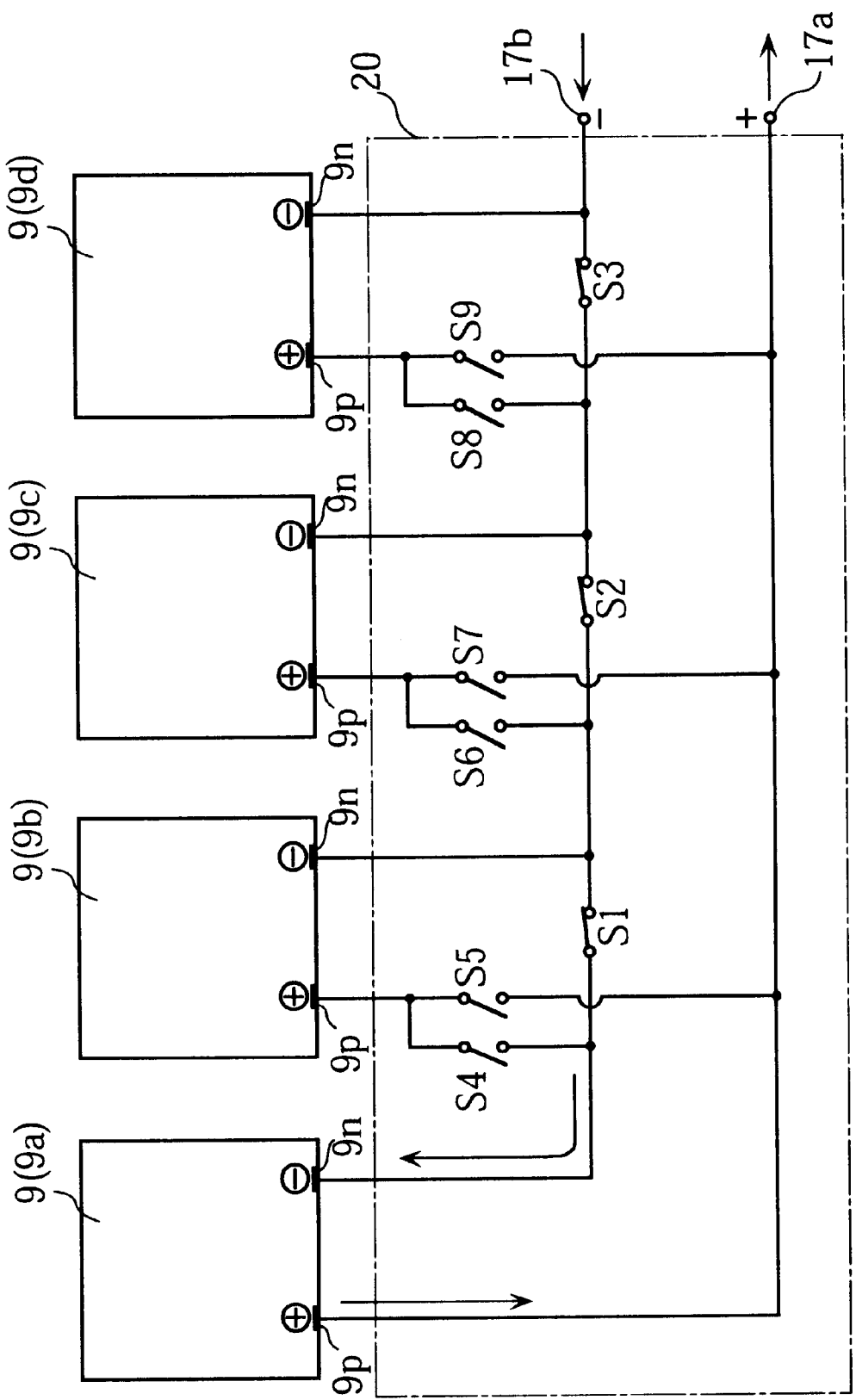
Figure 8:
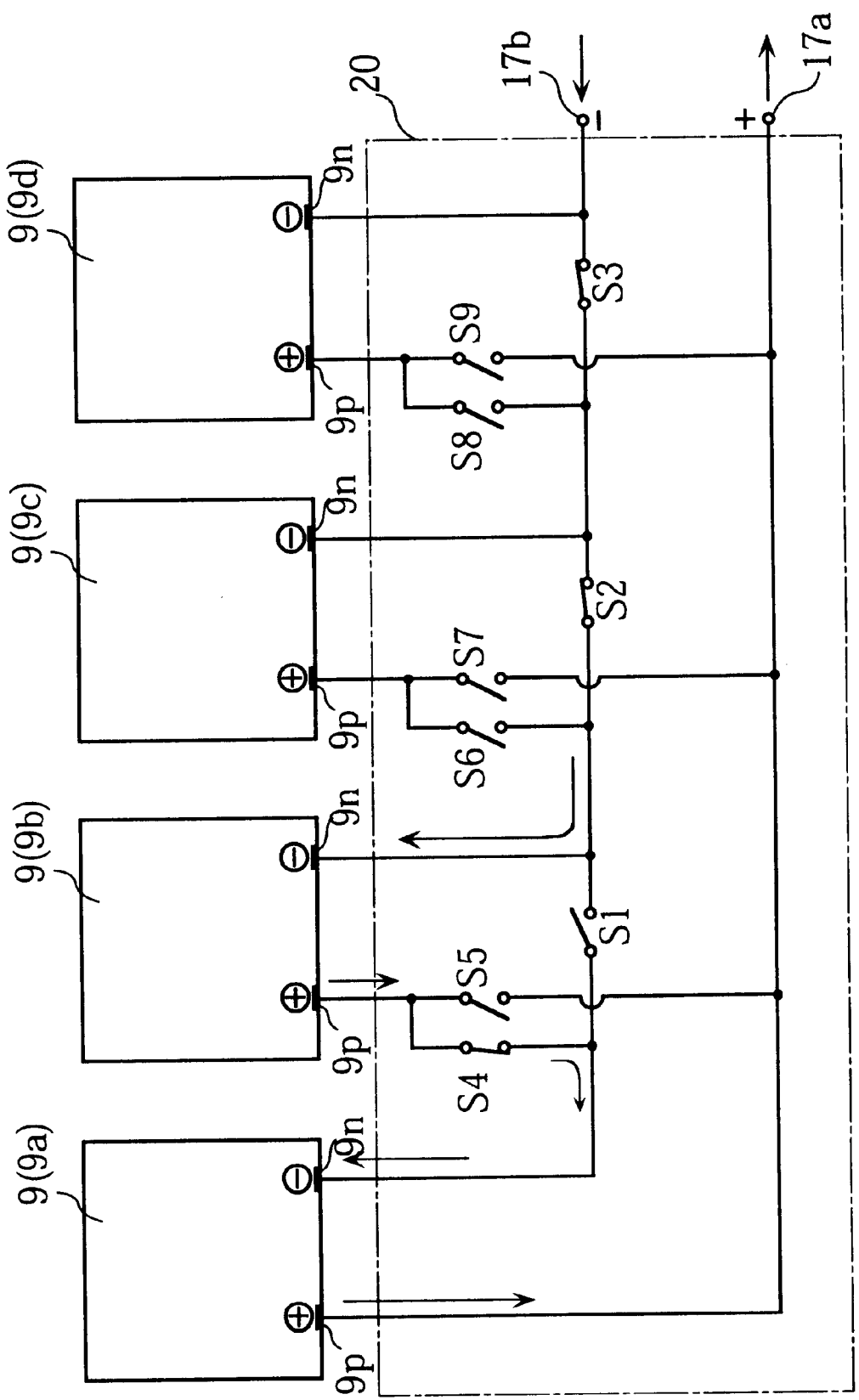

Further, as shown in FIG. 7, if the switches S1, S2 and S3 are turned on and the other switches S4–S9 are turned off, only the fuel cell stack 9a is connected to the output terminals 17a, 17b. As shown in FIG. 8, if the switches S2, S3 and S4 are turned on and the other switches S1, and S5–S9 are turned off, only two fuel cell stacks 9a, 9b are connected to the output terminals 17a, 17b.

As will be understood very easily, according to this electric circuit 20, it is also possible to connect only three fuel cell stacks 9 to the output terminals 17a, 17b by operating the switches S1–S9. The above switching operations are performed under the control by the operation control portion 16. Of course, the ON/OFF operations of the switches S1–S9 may be performed by another control component provided separately from the operation control portion 16.

In the operation control portion 17, the electric circuit 20 having the above-described arrangement is also provided correspondingly to the other twelve fuel cell stacks 9. As a result, a desired number of the fuel cell stacks 9 out of the total sixteen can be connected in parallel, thereby outputting the generated electricity from the output terminals 17a, 17b. Alternatively, a desired number of the fuel cell stacks 9 can be connected in series, thereby outputting the generated electricity from the output terminals 17a, 17b.

Next, function of the fuel cell system SY2 having the above arrangement will be described.

Referring to FIG. 4, an assumption is made now that all the valves 15 are opened. In this case, each of the fuel cell stacks 9 is supplied with hydrogen gas. At the same time, each of the fuel cell stacks 9 is supplied with air from the air supply piping 13. This allows all of the fuel cell stacks 9 to operate. Each of the fuel cell stacks 9 supplies electricity to the output control portion 17, and the electricity is supplied to an external component from the plural pairs of output terminals 17a, 17b of the output control portion 17. In this case, the electric circuit of the output control portion 17 allows whichever selection from the state in which a plurality of the fuel cell stacks 9 are connected in parallel (FIG. 5) and the state in which a plurality of the fuel cell stacks 9 are connected in series (FIG. 6). The voltage at the output terminals 17a, 17b is higher in the latter state than in the former state. This means that even if all of the fuel cell stacks 9 are operating, the voltage value of the electricity outputted from the output terminals 17a, 17b can be changed by changing the mutual connection from series to parallel or vice versa.

When the external component connected to the output terminal 17a, 17b does not need a large amount of electricity, then, for example, the valve 15 corresponding to the fuel cell stack 9 shown in FIG. 7 is opened, whereas the valves 15 corresponding to the other fuel cell stacks 9b–9d are closed. In this case, only the fuel cell stack 9a operates. The other fuel cell stacks 9b–9d do not operate because the supply of hydrogen gas is stopped and therefore the chemical reaction for generating electricity ceases. In this situation the supply of the air to each fuel cell stack may be continued. If the fuel cell stack 9a only is operated as described above, the electric circuit 20 of the output control portion 17 should be switched to a pattern shown in FIG. 7.

Further, the fuel cell system SY2 can also be used in the following mode: For example, the valves 15 respectively corresponding to two fuel cell stacks 9a, 9b shown in FIG. 8 are opened, whereas the valves 15 respectively corresponding to the other two fuel cell stacks 9c, 9d are closed. In this mode, the two fuel cell stacks 9a, 9b can be operated whereas the other two fuel cell stacks 9c, 9d can be out of operation. In this case, the electric circuit 20 of the output control portion 17 is switched to a pattern shown in FIG. 8. With this pattern, since the two fuel cell stacks 9a, 9b are connected in series, the voltage value outputted from the output terminals 17a, 17b is twice the voltage value obtained by the pattern shown in FIG. 7.

Still another mode of use differing from the above examples is that the three fuel cell stacks 9a–9c are operated in serial connection to the output terminals 17a, 17b. In this case, the voltage value outputted from the output terminals 17a, 17b is three times the voltage value obtained by the pattern shown in FIG. 7.

As will be understood from the above description, according to the fuel cell system SY2 of the second embodiment, sixteen fuel cell stacks can be selectively operated by selectively opening or closing the plurality of valves 15. Therefore, it becomes possible to appropriately handle a case when a large amount of electricity is needed. In addition, when there is no need for a large amount of electricity, only an appropriate number of fuel cell stacks 9 can be operated, thereby eliminating useless operation of the fuel cell stacks 9. Thus, efficient supply of electricity matching the needs can be achieved. Further, according to the fuel cell system SY2, the voltage value of the electricity outputted from the output terminals 17a, 17b can be timely changed by changing the number of fuel cell stacks 9 operated and by switching the electric circuit of the output portion 17. Therefore, the external component can be readily and conveniently supplied with a voltage value exactly as or close to the required voltage value.

Figure 9:
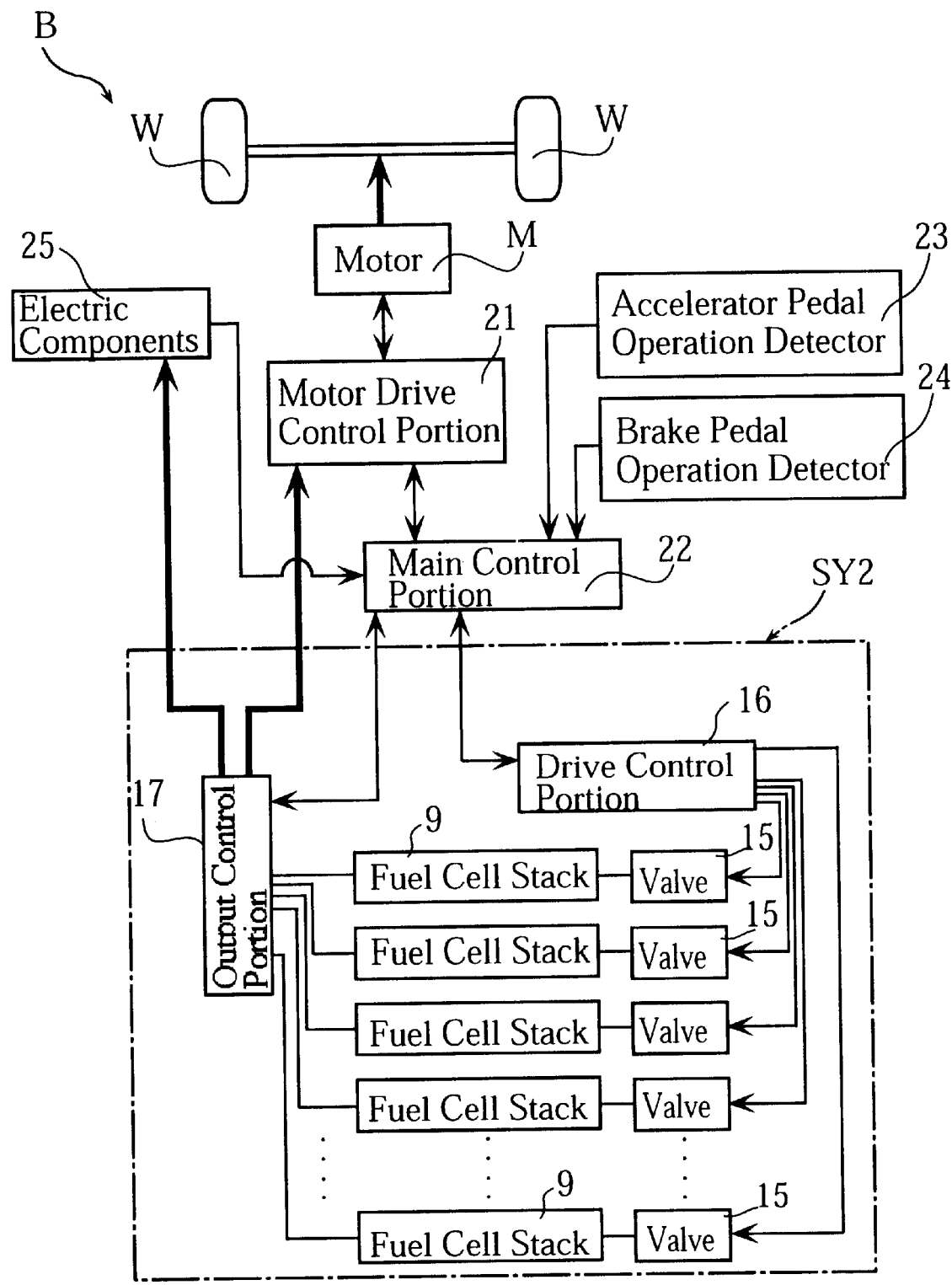
FIG. 9 is a diagram outlining an automobile powdered by the fuel cell system according to the second embodiment.

FIG. 9 is a block diagram showing an outline constitution of an electric car powered by the above fuel cell system SY2.

The electric car B shown in FIG. 9 comprises, in addition to the fuel cell system SY2, an electric motor M for driving drive wheels W, a motor drive control portion 21, a main control portion 22, accelerator pedal operation detector 23, brake pedal operation detector 24, and electric components 25.

The motor M is a DC motor. The motor drive control portion 21 is provided with an electric circuit for controlling (chopper control for example) a voltage to be applied to the motor M, based on commands from the main control portion 22. The motor drive control portion 21 is supplied with electricity outputted from the output control portion 17 of the fuel cell system SY2, as the electricity for driving the motor. The electric components 25 includes such components as a variety of lights, a wiper driving motor, and a compressor for an air conditioner. These electric components 25, too, are supplied with electricity from the output control portion 17 of the fuel cell system SY2. The amount of electricity needed by the electric components 25 is monitored by the main control portion 22.

The main control portion 22 controls the drive control portion 16 of the fuel cell system SY2 and the motor drive control portion 21. The main control portion 22 calculates a voltage necessary for driving the motor M in response to signals sent from the accelerator pedal operation detector 23 and the brake pedal operation detector 24. Further, the main control portion 22, sends control commands to the drive control portion 16 and the output control portion 17 so that an amount of electricity necessary to achieve the calculated voltage will be supplied from the fuel cell system SY2 to the motor drive control portion 21. Still further, the main control portion 22 sends control commands to the drive control portion 16 and the output control portion 17 so that an amount of electricity necessary for the electric components 25 will be appropriately supplied from the fuel cell system SY2 to the electric components 25. In accordance with these control commands, the drive control portion 16 performs the open/close operation of the valves 15, allowing the necessary number of fuel cell stacks 9 to operate. Likewise, the output control portion 17 changes the pattern of electric connection among the total of sixteen fuel cell stacks 9 according to the control commands.

A portion of the sixteen fuel cell stacks 9 serves as the power source for driving the motor M, whereas the rest of the fuel cell stacks 9 serves as the power source for the electric components 25. There is no or little need for varying the voltage of the electricity to be supplied to the electric components 25. Therefore, the fuel cell stacks 9 used as the power source for the electric components 25 may be permanently connected in series to the output terminals 17a, 17b of the output control portion 17.

In the electric car B of the above arrangement, when the amount of the accelerator pedal (not illustrated) operation is large, all or most of the fuel cell stacks 9 dedicated to driving the motor are operated under control by the main control portion 22 and the drive control portion 16, supplying a high voltage of electricity from the output control portion 17 to the motor drive control portion 21. Therefore, the voltage applied by the motor drive control portion 21 to the motor M can be increased, making possible to appropriately increase a torque of the motor M.

When the amount of the accelerator pedal operation is small or when the amount of the brake pedal operation is large, only a small number of fuel cell stacks 9 dedicated to driving the motor are operated, and a low voltage electricity is supplied from output control portion 17 to the motor drive control portion 21. In this case, the voltage applied by the motor drive control portion 21 to the motor M can be decreased, making possible also to appropriately decrease the torque of the motor M.

On the other hand, if the electric components 25 need a large amount of electricity, all or most of the fuel cell stacks 9 dedicated to the electric components are operated under the control of the main control portion 22 and the drive control portion 16. On the contrary, if the amount of electricity needed is small, the number of the fuel cell stacks 9 operated is decreased.

As has been described, according to the electric car B, both the motor M for driving the car and the electric components 25 can be supplied with electricity of a necessary voltage or a necessary amount from the fuel cell system SY2. Further, by eliminating unnecessary operation of the fuel cell stacks 9, efficient supply of electricity can be achieved.

Figure 10:
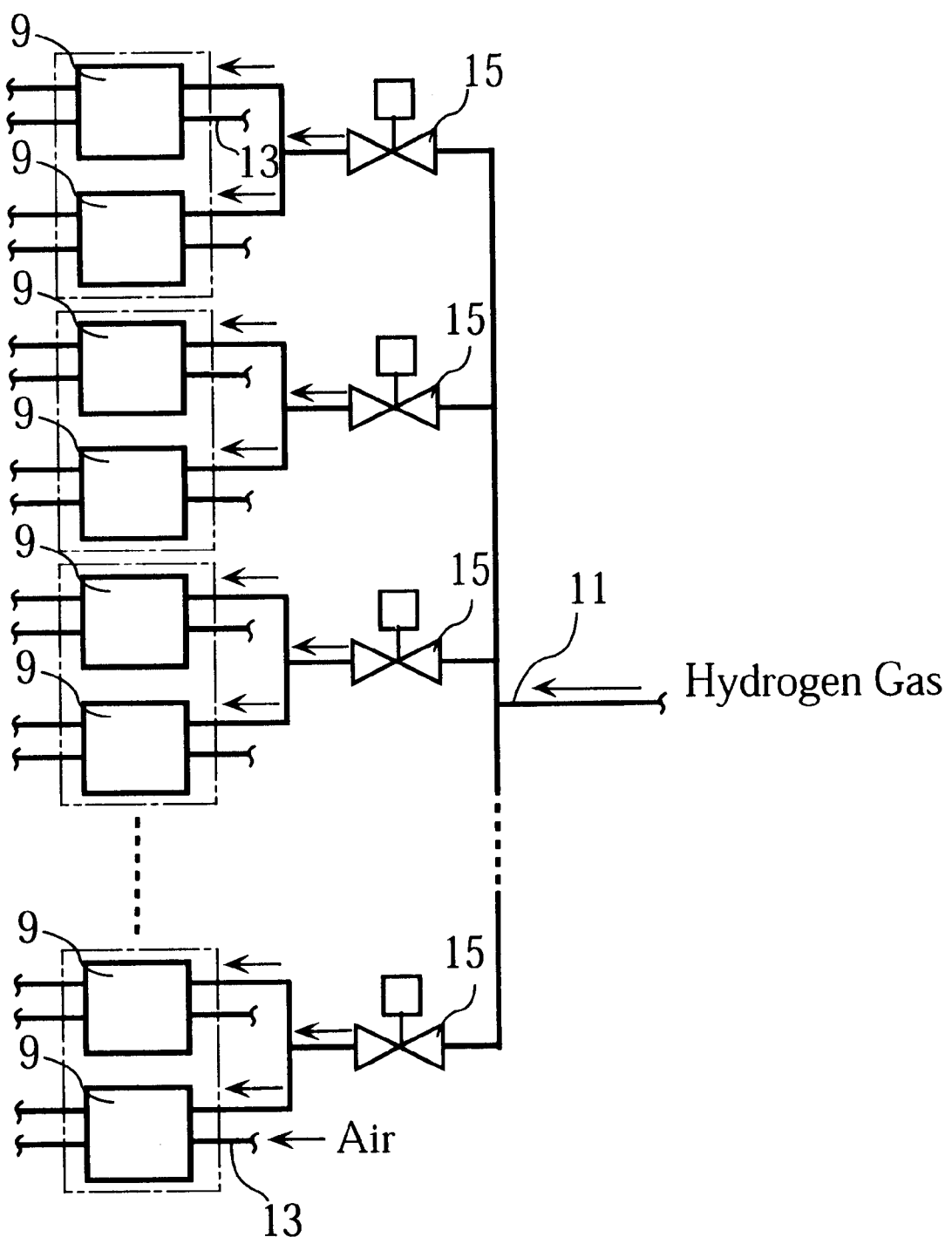
FIG. 10 shows a variation example of the fuel cell system according to the second embodiment.

FIG. 10 shows a variation example of the fuel cell system SY2 shown in FIG. 4. In the illustrated arrangement, the fuel cell stacks 9 are divided into a plurality of groups each including two fuel cell stacks 9. Each group is provided with the valve 15. According to this arrangement, by opening or closing one valve 15, supply of hydrogen gas to the corresponding two fuel cell stacks 9 can be started or stopped simultaneously. Needless to say, according to the present invention, the fuel cell stacks 9 may be divided so that each of the groups includes three fuel cell stacks 9.

Figure 11:
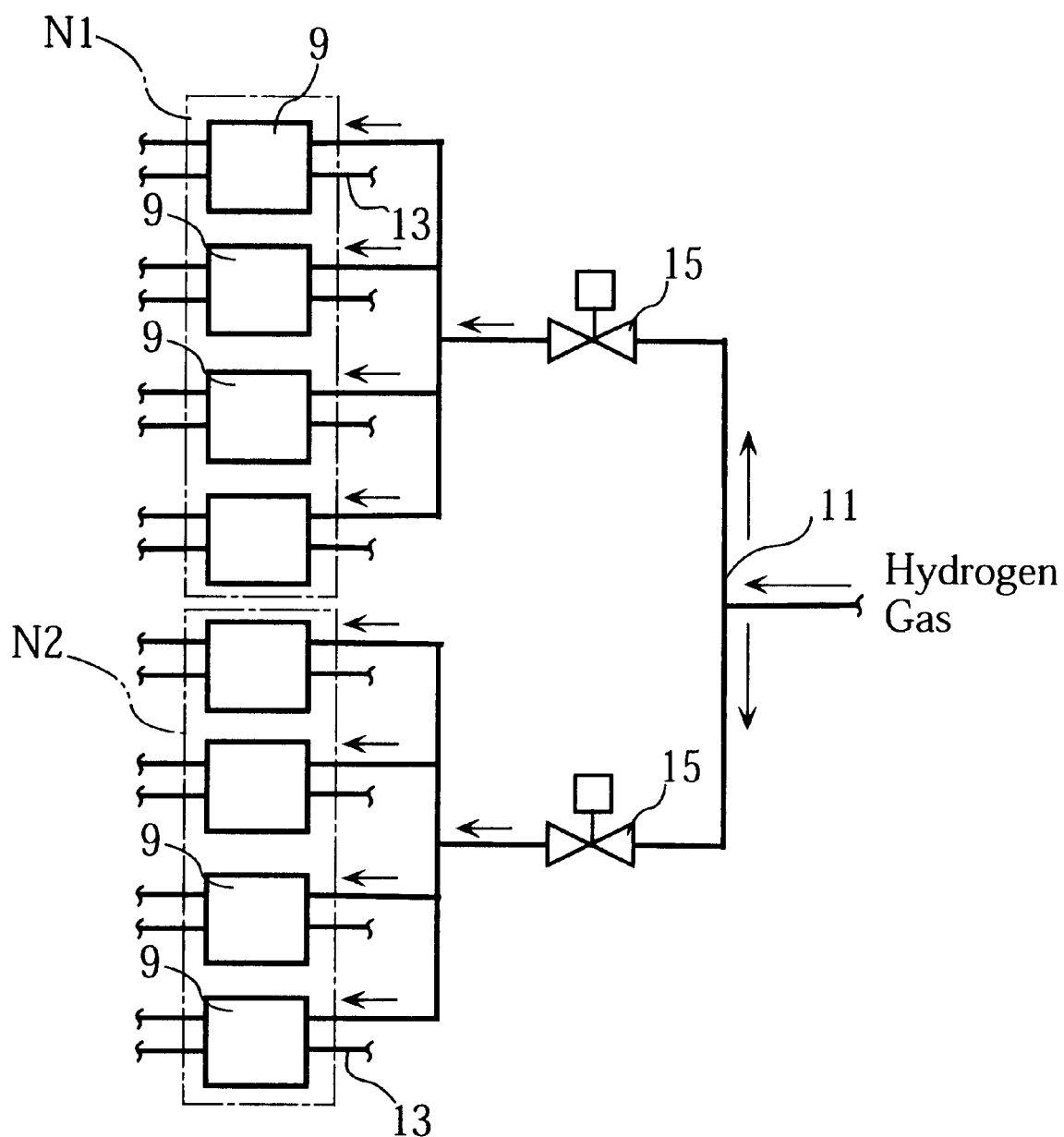
FIG. 11 shows another variation example of the fuel cell system according to the second embodiment.

FIG. 11 shows an arrangement in which the fuel cell stacks 9 are divided into two groups N1, N2. Even with this arrangement, it is possible to supply electricity in accordance with the needed amount, by switching between a state in which all of the fuel cell stacks 9 are operated and a state in which only the fuel cell stacks 9 in either one of the two blocks N1, N2 are operated.

In the second embodiment (see FIG. 4) described above, the piping 13 for supplying air to the fuel cell stacks 9 is provided with only one valve. However, the present invention is not limited to this, and the piping 13 may be provided with a plurality of valves. In this case, when hydrogen gas supply to the fuel cell stacks 9 is stopped, supply of the air can also be stopped simultaneously. Further, according to the present invention, it is also possible to operate and stop the fuel cell stacks 9 by continuing the supply of hydrogen gas to the fuel cell stacks 9 and controlling the supply of air to the fuel cell stacks 9.

Next, reference will be made to FIG. 12A. This figure shows a fuel cell system SY3 according to a third embodiment of the present invention. Like the fuel cell system SY1 (FIG. 1) according to the first embodiment, the fuel cell system SY3 is provided with one fuel cell stack 26. In addition to this, the fuel cell system SY3 further comprises a hydrogen gas supplying source 27, a compressor 28 and a humidifier 29.

The hydrogen gas supplying source 27 includes a dimethyl ether supplying source 30, a reforming device 31, and a Co oxidizing device 35. The dimethyl ether supplying source 30 is provided with pressure containers 30a made, for example, of aluminum. Each of the pressure containers 30a is loaded with dimethyl ether (DME) liquefied under pressure. The pressure is approximately 5 atm (507 kPa). By the liquefaction, a greater amount of the dimethyl ether can be stored and carried advantageously.

The reforming device 31 is a device for producing hydrogen gas by reaction of the dimethyl ether. For this purpose, the reforming device 31 includes a gasifying portion 32, a steam generating portion 33, and a fuel reforming portion 34.

The gasifying portion 32 gasifies the dimethyl ether supplied from the dimethyl ether supplying source 30. The gasifying portion 32 includes a container 32a and heat exchanging pipe 32b housed therein. The container 32a is passed by exhaust gas (warmer than a room temperature) from the fuel cell stack 26. The heat exchanging pipe 32b communicates with the dimethyl ether supplying portion 30. As has been mentioned earlier, the dimethyl ether is loaded in the pressure container 30a in the liquefied state under pressure. However, when actually reforming dimethyl ether, the dimethyl ether must be gasified, and heated to a temperature suitable for the reformation. Dimethyl ether from the dimethyl ether supplying source 30 flows toward the gasifying portion 32 due to a difference between the pressure in the pressure container 30a and in the heat exchanging pipe 32b. With a decrease in pressure, part of the dimethyl ether is vaporized. The dimethyl ether which reaches the heat exchanging pipe 32b absorbs heat from around (the gas within the container 32a) when passing the heat exchanging pipe 32b. This gasifies the dimethyl ether. On the other hand, temperature of the gas which has given heat to the dimethyl ether decreases, allowing water vapor to condense. As a result, water is produced at a lower portion of the container 32b, and the water is stored in a water tank 36.

The steam generating portion 33 generates steam by heating the water from the water tank 36. The steam generating portion 33 includes a container 33a, temperature-raising pipe 33b, and a thermocouple TC1. The container 33a is loaded with a catalyzer which promotes combustion of hydrogen and another catalyzer which promotes combustion of dimethyl ether. The temperature-raising pipe 33b communicates with the heat exchanging pipe 32b of the gasifying portion 32. The thermocouple TC1 monitors temperatures in the temperature-raising pipe 33b and in the container 33a. Examples of the catalyzers for promoting combustion of hydrogen and dimethyl ether includes noble metals such as Pt and Pd directly supported by a monolith supporter, and these supported by the monolith supporter with a catalyzer support. Further, examples of the catalyzers of a different origin include an oxide of a base metal, and a composite oxide such as perovskite formed into an appropriate shape.

The steam generating portion 33 is further supplied with air (oxygen) by a compressor 28. Further, the steam generating portion 33 is supplied with part of the raw material dimethyl ether collected between the heat exchanging pipe 32b and the temperature-raising pipe 31b, and further supplied with non-reacted gas (non-reacted hydrogen gas) which was not used in the fuel cell stack 26. The dimethyl ether collected between the heat exchanging pipe 32b and the temperature-raising pipe 31b is supplied to the steam generating portion 33 via control means 37a. The control means 37a works with the thermocouple TC1.

In the steam generating portion 33, water is vaporized by burning oxidization of the hydrogen, or by increasing the temperature in the container 3a through burning oxidization of the collected raw material dimethyl ether.

During a certain amount of time immediately following system start up, it is difficult to stably supply the non-reacted gas from the fuel cell stack 26 to the steam generating portion 33. For this reason, water is changed into steam by burning the raw material dimethyl ether supplied via the control means 37. When the non-reacted gas can be supplied stably, the non-reacted gas is supplied to the steam generating portion 33 and burned to change water into steam.

Figure 12A:
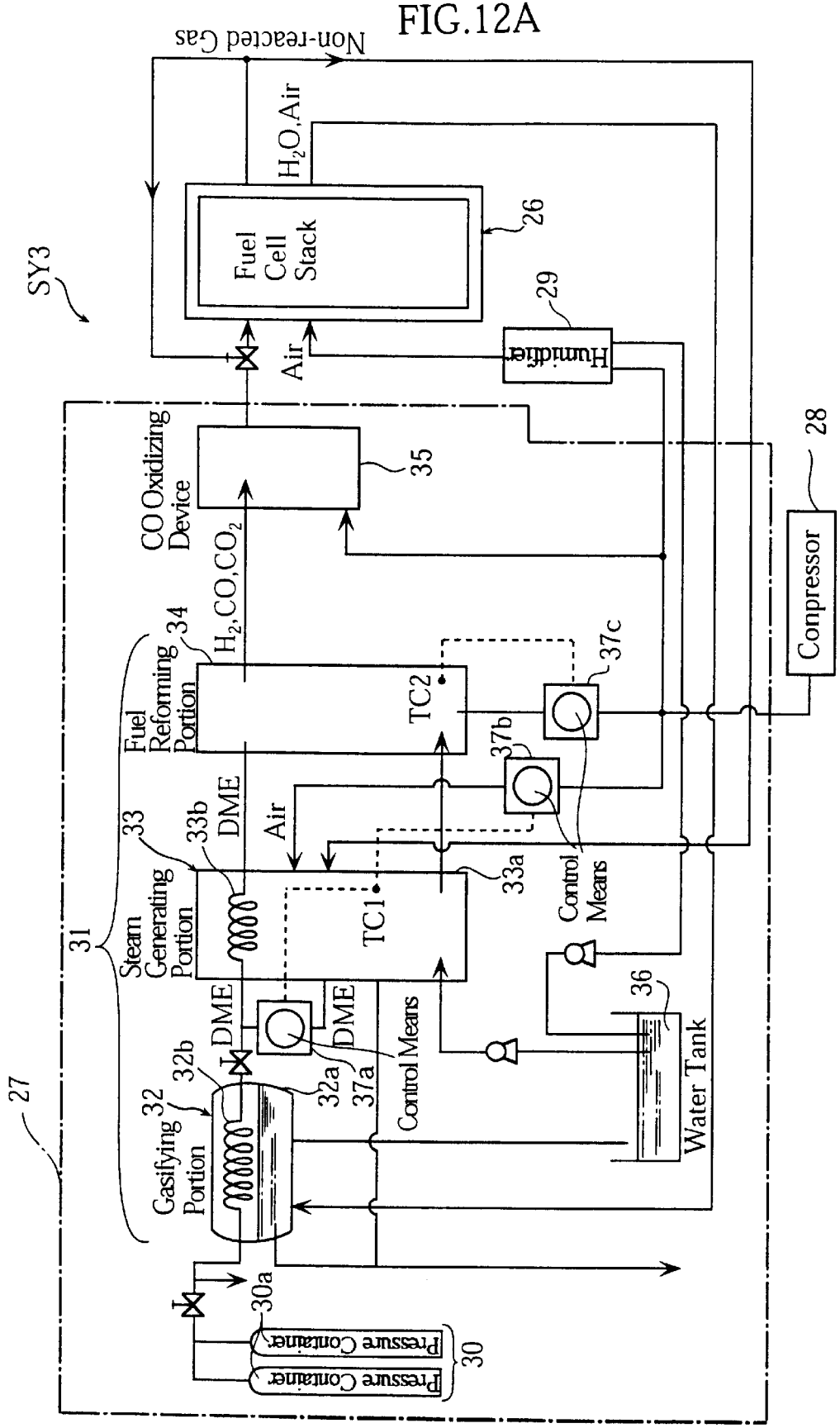
FIG. 12A is a diagram outlining a constitution of a fuel cell system according to a third embodiment of the present invention.

According to the embodiment shown in FIG. 12A, a control means 37b capable of selecting between air-supply- ON state and air-supply-OFF state. The control means 37b works with the thermocouple TC1.

If the thermocouple detects that the temperature within the steam generating portion 33 has become not lower than a predetermined value, the control means 37a and the control means 37b operate to decrease the amount of the raw material dimethyl ether and the air supplied to the steam generating portion 33. This reduces the burning oxidization reaction in the steam generating portion 33, preventing the temperature in the steam generating portion 33 from becoming excessively high. On the contrary, if the temperature within the steam generating portion 33 has gone down below the predetermined value, the burning oxidization reaction is promoted by increasing the amount of the raw material dimethyl ether and the air supplied to the steam generating portion 33. With this arrangement, it becomes possible to stably generate steam in the steam generating portion 33, as well as appropriately preventing overheating in the steam generating portion 33. The control means 37a, 37b can be constituted by a variety of flow control devices including a switching valve for example.

According to the embodiment shown in FIG. 12A, the fuel for obtaining hydrogen gas is dimethyl ether. The use of dimethyl ether is more advantageous than the use of methanol for the following reasons: Specifically, the burning oxidization of dimethyl ether (complete oxidization reaction) is represented by the reaction formula (5) whereas the complete oxidization reaction of methanol is represented by the reaction formula (6):

$$CH_3OCH_3(g)+3O_2(g) \rightarrow 3H_2O(g)+2CO_2(g)+1460.46 \text{ kJ/mol} \quad (5)$$

$$CH_3OH(l)+3/2O_2(g) \rightarrow 2H_2O(g)+CO_2(g)+637.64 \text{ kJ/mol} \quad (6)$$

As is clear from these reaction formulae, dimethyl ether generates more than two times of thermal energy than methanol per unit of mass of the substance in the burning oxidization. In other words, if dimethyl ether is used as a fuel for heating, temperature raising and so on, the amount of dimethyl ether needed is less than half of the amount of methanol necessary for obtaining an equivalent thermal energy. For this reason, when the non-reacted gas cannot be supplied sufficiently to the steam generating portion 33 (i.e. when it is necessary to burn part of the reformation raw material), loss of the raw material is less if dimethyl ether is used as the reformation raw material than if methanol is used as the reformation raw material.

The steam generated in the steam generating portion 33 and the raw material dimethyl ether having passed the temperature-raising pipe 33b are sent to the fuel reforming portion 34 via respective separate channels. Since the temperature-raising pipe 33b is incorporated in the steam generating portion 33, dimethyl ether is heated by the heat in the container 33a when passing through the temperature-raising pipe 33b.

The fuel reforming portion 34 produces hydrogen gas by reaction between the diethyl ether and the steam sent from the steam generating portion 33. In order to promote this reaction, the fuel reforming portion 34 is loaded therein with a catalyzer. Examples of the catalyzer are Cu—Zn catalyzers and Ni catalyzers. The catalyzer selected from these is coated onto such a supporting structure as a metal net, a honeycomb support, and so on, or supported by a supporter such as pellets, and loaded into a container.

As shown in FIG. 12A, the fuel reforming portion 34 is provided with a thermocouple TC2. Further, control means 37c is provided between the fuel reforming portion 34 and the compressor 28. The control means 37c works with the thermocouple TC2. Temperature in the fuel reforming portion 34 is detected by the thermocouple TC2 and the control means 37c operates on the basis of the detected temperature. With this arrangement, the amount of air supplied to the fuel reforming portion 34 can be controlled in accordance with the temperature in the fuel reforming portion 34.

In the fuel reforming portion 34, a reaction between diethyl ether and steam (steam reforming reaction) as represented by the following reaction formula (7) occurs. Further, along with this major reaction, another reaction (partial oxidization reaction) between diethyl ether and oxygen gas represented by the following formula (8) occurs also. These reactions produce hydrogen gas:

$$CH_3OCH_3(g)+3H_2O(g) \rightarrow 6H_2(g)+2CO_2(g)-122.49 \text{ kJ/mol } (85.7\%)$$

$$CH_3OCH_3(g)+3/2O_2(g) \rightarrow 3H_2(g)+2CO_2(g)+735 \text{ kJ/mol } (14.3\%) \quad (8)$$

On the other hand, if methanol is used as the raw material, hydrogen gas is produced by the following steam reforming reaction represented by the reaction formula (9) and partial oxidization reaction represented by the reaction formula (10):

$$CH_3OH(g)+H_2O(g) \rightarrow 3H_2(g)+2CO_2(g)-49.5 \text{ kJ/mol } (79.3\%) \quad (9)$$

$$CH_3OH(g)+1/2O_2(g) \rightarrow 2H_2(g)+CO_2(g)+189.5 \text{ kJ/mol } (20.7\%) \quad (10)$$

As will become clear from comparison between methanol and diethyl ether used as the reforming raw material, diethyl ether has an advantage of producing a greater amount of hydrogen per unit mass of the substance.

As is clear from the above reaction formulae (7) and (8), the steam reforming reaction, as well as the partial oxidization reaction, will leave carbon dioxide in addition to the hydrogen gas. Further, the reactions will also leave carbon monoxide if the oxidization is not sufficient. As a result, the fuel reforming portion 34 yields a hydrogen-rich fuel gas containing the supplied dimethyl ether, carbon monoxide, and carbon dioxide. The fuel gas is introduced into the CO oxidizing device 35.

The CO oxidizing device 35 oxidizes the carbon monoxide into carbon dioxide. For this purpose, the CO oxidizing device 35 is loaded with one or more kinds of catalyzers selected, for example, from Pt, Pd, Ru, and Rh catalyzers. The catalyzers selected from these are supported by such a supporting structure as a metal net, alumina pellets and so on, and loaded within a container. A fuel cell to be described later uses a reaction between hydrogen gas and the oxygen gas under presence of platinum as the catalyzer. As is widely known, carbon monoxide poisons platinum. Therefore concentration of the carbon monoxide in the fuel gas supplied to the fuel cell should be as low as possible. For this reason, in the embodiment shown in FIG. 12A, the carbon monoxide concentration is reduced by the CO oxidizing device 35 where carbon monoxide is oxidized into carbon dioxide. The fuel gas thus obtained is then introduced into the fuel cell stack 26.

Though not illustrated in FIG. 12A, the fuel cell stack 26 is a plurality of fuel cells laminated in series. Each of the fuel cells has a positive electrode, a negative electrode and an electrolyte portion. The negative electrode is supplied with the fuel gas from the CO oxidizing device 35. The positive electrode is supplied with air from the compressor 28. The air is moistened by a humidifier 29 before supplied to the fuel cell stack 26. The moistening is performed by using water stored in the water tank 36.

At the negative electrode of each fuel cell, the hydrogen gas in the fuel gas is dissociated into hydrogen ions and electrons as shown in the reaction formula (11). On the other hand, at the positive electrode of each fuel cell, as shown in the following reaction formula (12), oxygen gas in the air reacts with the electrons and the hydrogen ions coming through the electrolyte portion, to produce water.

$$H_2 \rightarrow 2H^+ + 2e^- \tag{11}$$

$$4H^+ + O_2 + 4e^- \rightarrow 2H_2O \tag{12}$$

The water produced is supplied to the gasifying portion 32 of the reforming device 31 together with air discharged from the fuel cell stack 26, and then used for gasifying of the raw material dimethyl ether. Further, non-reacted gas not used in the fuel cell stack 26 is supplied to the steam generating portion 33 for the burning oxidization.

Figure 12B:
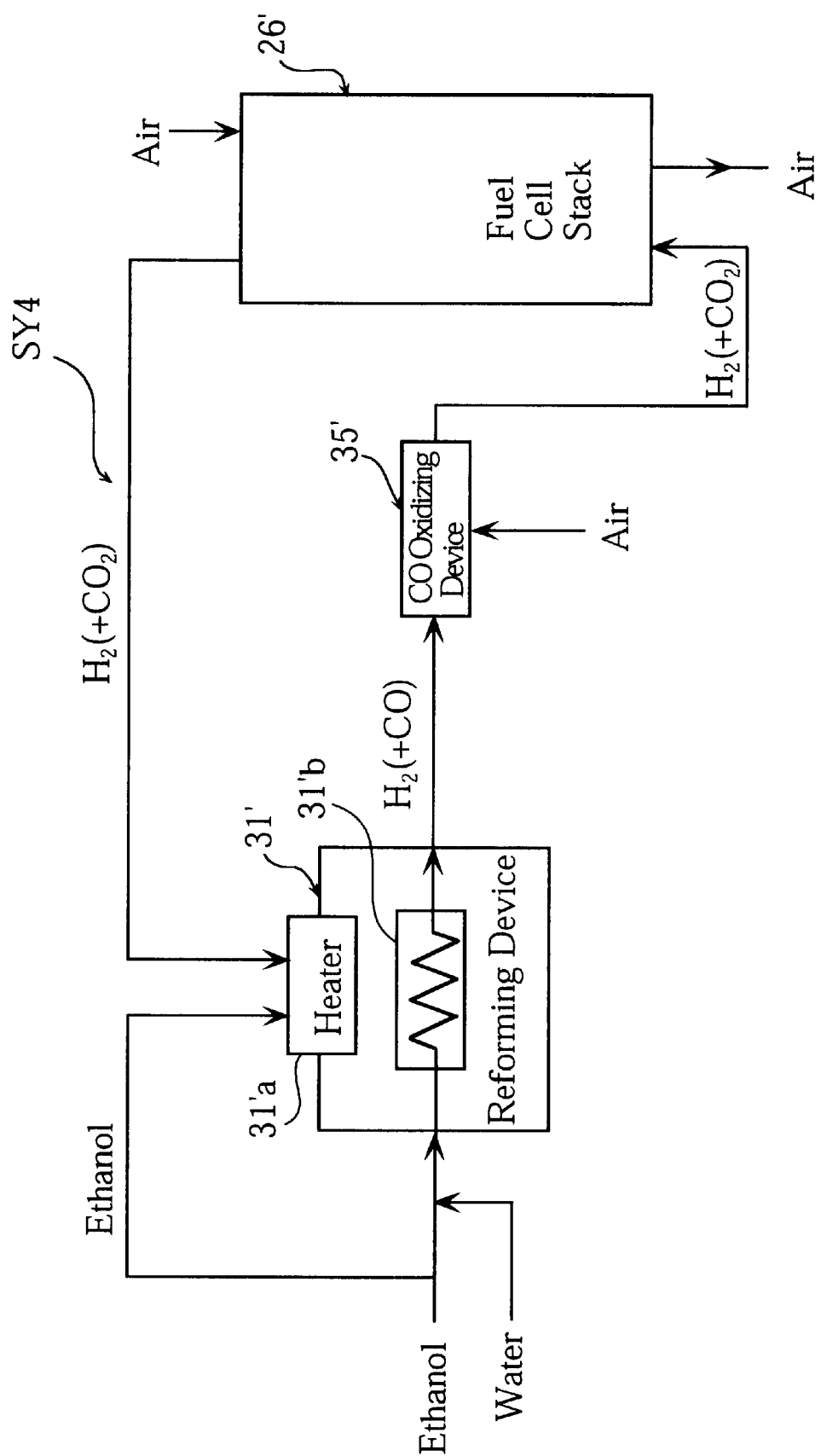
FIG. 12B is a diagram outlining a constitution of a fuel cell system according to a fourth embodiment of the present invention.

Dimethyl ether used as the hydrogen-containing compound according to the fuel cell system SY3 can be replaced with ethanol according to the present invention. FIG. 12B is a diagram showing an outline constitution of a fuel cell system SY4 which uses ethanol as the hydrogen-containing compound. The fuel cell system SY4 comprises a fuel cell stack 26', a reforming device 31', and a CO oxidizing device 35'.

The reforming device 31' includes a heater 31a' for heating the inside of the reforming device 31' to a temperature suitable for the reformation of ethanol. Further, the reforming device 31' includes a reforming chamber 31'b. The reforming chamber 31'b is loaded with a catalyzer for reforming the ethanol. As shown in FIG. 12B, the reforming chamber 31'b is supplied with ethanol and water. These ethanol and water are heated by the heater 31'a. Under the presence of the active catalyzer, these heated ethanol and water react with each other, producing carbon monoxide and hydrogen. It should be noted here that part of the ethanol is supplied to the heater 31'a as a fuel for operating the heater 31'a.

The carbon monoxide and hydrogen obtained as described above are then sent to the CO oxidizing device 35'. As shown in FIG. 12B, the CO oxidizing device 35' is also supplied with air. Here, only carbon monoxide is oxidized under the presence of a catalyzer (a photocatalyzer for example) to become carbon dioxide. Thereafter, the hydrogen and carbon dioxide are supplied to the fuel cell stack 26', and used for generating electricity. Hydrogen and carbon dioxide not used for the electric generation is supplied to the heater 31'a as a fuel for operating the heater 31'a.

Figure 13:
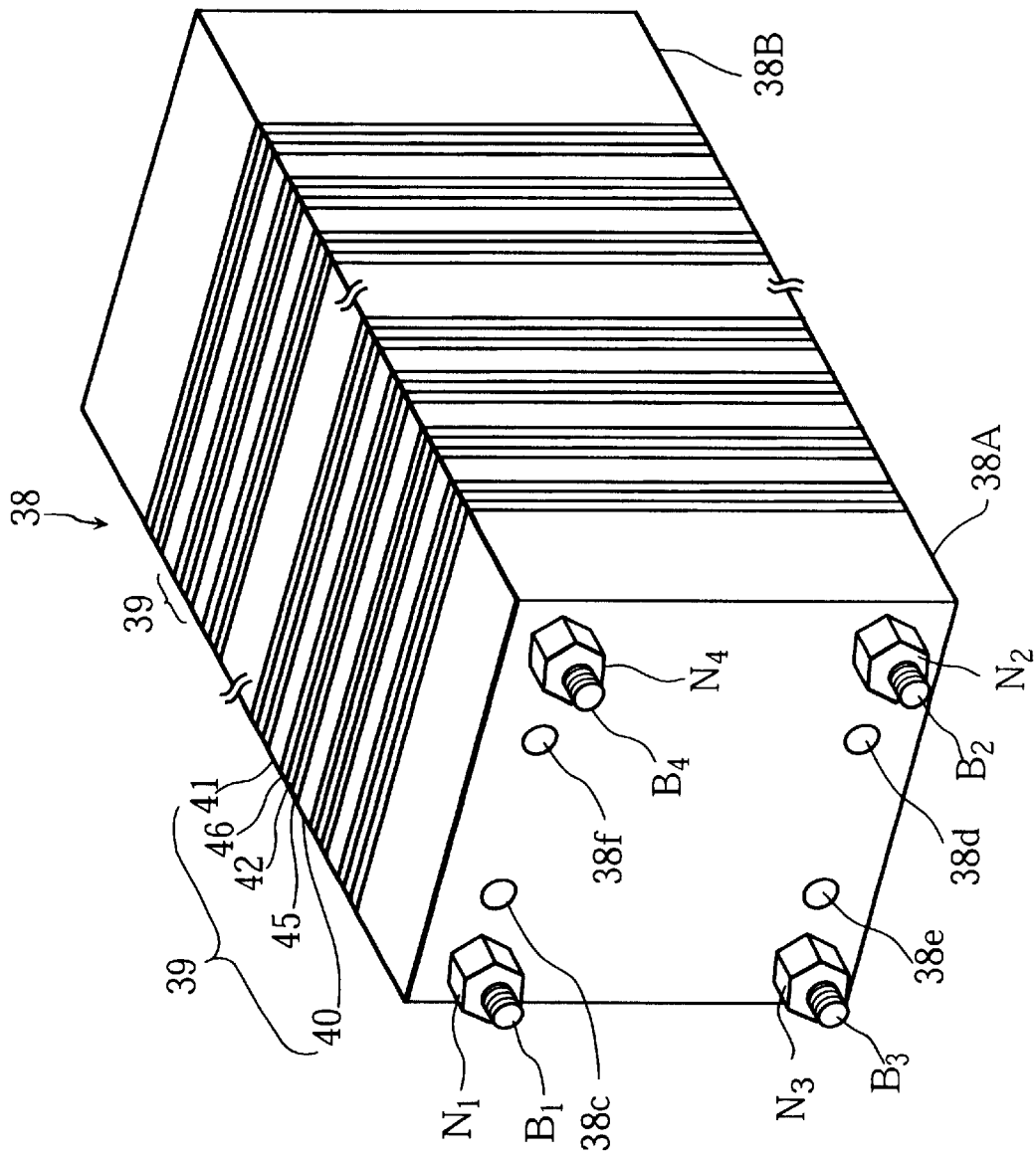
FIG. 13 is a perspective view of a fuel cell stack used in the fuel cell system according to the present invention.
Figure 14:
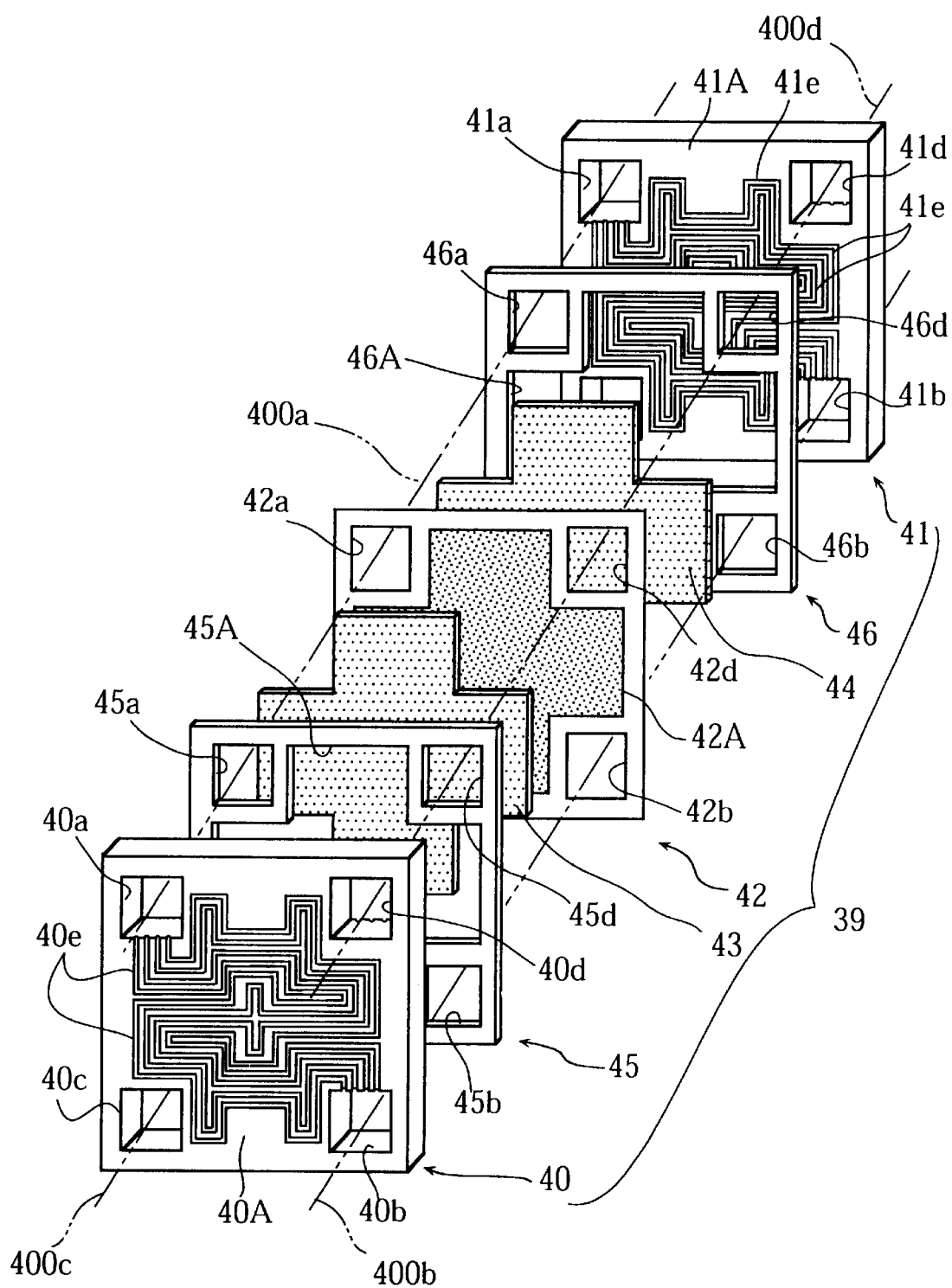
FIG. 14 is an exploded view of the fuel cell stack.
Figure 15:
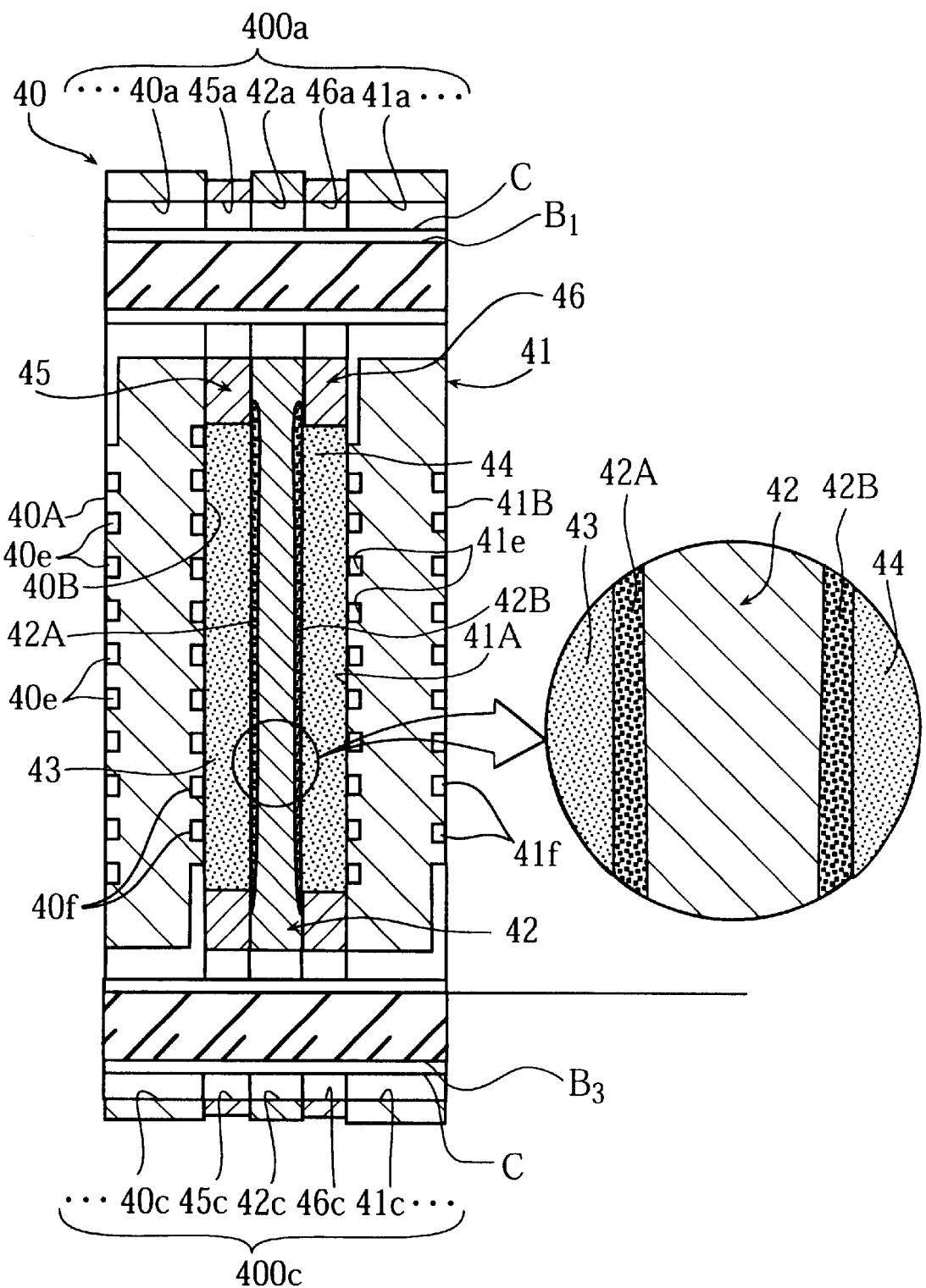
FIG. 15 is a sectional view of a primary portion of the fuel cell stack.

Next, reference is made to FIGS. 13–15. These figures show an example of the fuel cell stack usable in the above-described fuel cell systems YS1–YS3.

The illustrated fuel cell stack (the entire stack is indicated by numeral code 38) includes a plurality of fuel cells 39 in lamination. These fuel cells 39 is connected in series, and are supported between a first endplate 38A and a second endplate 38B. These endplates 38A, 38B are fixed to each other by four bolts $B_1$–$B_4$ and four nuts $N_1$–$N_4$.

As shown clearly in FIG. 14, each of the fuel cells 39 includes a first separator 40, a second separator 41, and an ion exchange film (electrolyte portion) 42 disposed between these separators. Each of the separators 40, 41 must have good heat resistance and corrosion resistance, high mechanical strength, and easy machineability. In order to satisfy these, each of the separators 40, 41 is made of a high-density carbon material bound by phenol resin, a variety of metals and alloys (titanium, stainless steel, titanium alloy, etc.)

The fuel cell 39 includes a cross-shaped negative-electrode collector 43 disposed between the first separator 40 and the ion exchange film 42, and a cross-shaped positive-electrode collector 44 disposed between the second separator 41 and the ion exchange film 42. Further, the fuel cell 39 includes a first gasket 45 disposed between the first separator 40 and the ion exchange film 42, and a second gasket 46 disposed between the second separator 41 and the ion exchange film 42. The first gasket 45 is formed with a cross-shaped opening 45A for fitting the negative-electrode collector 43, whereas the second gasket 46 is formed with a cross-shaped opening 46A for fitting the positive-electrode collector 44. In FIG. 14, the first separator 40 is common to the illustrated fuel cell and another fuel cell (not illustrated) on the left. Likewise, the second separator 41 is common to the illustrated fuel cell and another fuel cell (not illustrated) on the right.

The first separator 40 has four corners formed with a first through hole through a fourth through hole 40a–40d for insertion of the four bolts $B_1$–$B_4$ (FIG. 13) respectively. Each of the through holes has a square section. Likewise, the second separator 41 has four corners formed with a first through hole through a fourth through hole 41a–41d respectively. Corresponding to these first to fourth through holes of the separators, the ion exchange film 42, the first gasket 45 and the second gasket 46 are respectively formed with four through holes (42a–42d, 45a–45d, 46a–46d).

As shown in FIG. 15, when the fuel cells 39 are appropriately laminated, the above-described first through holes come in alignment on a same axis. As a result, a communicating hole 400a allowing insertion of the bolt $B_1$ is formed. (See also FIG. 14.) Likewise, the above-described second through holes come in alignment on a same axis, forming a communicating hole 400b (FIG. 14) allowing insertion of the bolt $B_2$. As will be easily understood, communicating holes 400c (FIGS. 14, 15) and 400d (FIG. 14) are formed to allow insertion of the other two bolts $B_3$ and $B_4$. A member indicated by letter C in FIG. 15 is a tube through which the bolts $B_1$–$B_4$ are inserted.

As shown in FIG. 13, the first endplate 38A is formed with four supply ports 38c, 38d, 38e, 38f for supplying hydrogen gas or oxygen-containing gas. The supply ports 38c–38f communicates with the communicating holes 400a–400d respectively within the endplate 38A. Though not illustrated in the figure, the second endplate 38B is also formed with four holes (discharge ports) corresponding to the supply holes 38c, 38d, 38e, 38f, communicating with the communicating holes 400a–400d respectively.

The first and second separators 40, 41 are entirely made of a metal conductor such as titanium, and are formed like plates respectively. As will be described later, the first and second separators 40, 41 are used when supplying hydrogen gas and oxygen-containing gas, and therefore made of a material having good heat resistance and high mechanical strength. The material other than titanium for forming the first and second separators 40, 41 may be stainless steel, titanium alloy and so on.

As shown in FIG. 14 or FIG. 15, each of the first separators 40 has a first surface 40A and a second surface 40B away therefrom. Likewise, each of the second separators 41 has a first surface 41A and a second surface 41B away therefrom. The first surface 40A of the first separator 40 is formed with a plurality of grooves 40e each communicating between the first through hole 40a and the second through hole 40b without crossing each other. These, grooves 40e can be formed by photo etching for example. Likewise, the first surface 41A of the second separator 41 is formed with a plurality of grooves 40e each communicating between the first through hole 41a and the second through hole 41b. These grooves 40e and 41e are paths for supplying the oxygen-containing gas. On the other hand, the second surface 40B of the first separator 40 is formed with a plurality of grooves 40f communicating between the third through hole 40c and the fourth through hole 40d, whereas the second surface 41B of the second separator 41 is formed with a plurality of grooves 41f communicating between the third through hole 41c and the fourth through hole 41d. These grooves 40f, 41f formed in the second surfaces of each separator are paths for supplying hydrogen gas.

The surfaces of the first separator 40, excluding the grooves 40e, are plated with platinum for protection. Likewise, the surfaces of the second separator 41, excluding the grooves 41e, are plated with platinum for protection. Bottom surfaces and inside walls of the grooves 40e of the first separator 40 and of the grooves 41e of the second separator 41 are coated with a fluororesin for example.

The ion exchange film 42 has proton conductivity, selectively allowing hydrogen ions to pass through. A catalyzer portion is formed on each side of the ion exchange film 42. Specifically, in FIG. 15, the left surface of the ion exchange film 42 is formed with a negative-electrode catalyzer portion 42A, whereas the right surface is formed with a positive-electrode catalyzer portion 42B.

The negative-electrode catalyzer portion 42A is, for example, a porous layer made of catalyzer grains of carbon having surfaces supporting platinum (or palladium) and allows hydrogen molecules and hydrogen ions to pass through. The negative-electrode catalyzer portion 42A dissociates the supplied hydrogen gas into hydrogen ions and electrons.

On the other hand, the positive-electrode catalyzer portion 42B is, for example, a porous layer made of catalyzer grains of carbon having surfaces supporting platinum (or palladium) and rhodium and allows oxygen molecules to pass through. At the positive-electrode catalyzer portion 42B, the oxygen gas reacts with hydrogen ions and electrons to produce water.

The negative-electrode collector 43 is a porous member made of a carbon material for example, and is formed in a generally cross shape. The negative-electrode collector 43 collects the electrons dissociated from the hydrogen gas at the negative-electrode catalyzer potion 42A so that the electrons can be taken out of the fuel cell 39. Further, the negative-electrode collector 43 allows the supplied hydrogen to pass through to the negative-electrode catalyzer portion 42A.

On the other hand, the positive-electrode collector 44, like the negative-electrode collector 43, is a porous member made of a carbon material for example, and is formed in a generally cross shape. The positive-electrode collector 44 receives electrons from outside so that the electrons can be supplied to the positive-electrode catalyzer portion 42B. Further, the positive-electrode collector 44 allows the supplied oxygen-containing gas to pass through to the positive-electrode catalyzer portion 42B.

The first gasket 45 increases sealing between the ion exchange film 42 and the first separator 40, whereas the second gasket 46 increases sealing between the ion exchange film 42 and the second separator 41. As has been described earlier, the first and the second gaskets 45, 46 are formed with the generally cross-shaped opening 45A, 46A in their respective center portions. Therefore, in a state where each of the fuel cells is assembled (FIG. 15), the gasket 45, 46 surrounds the collectors 43, 44.

The fuel cell stack 38 described above operates as follows: First, hydrogen gas is supplied to the third and the fourth communicating holes 400c, 400d via the third and the fourth supply holes 38e, 38f of the first endplate 38A. This delivers the hydrogen gas to the grooves 40f of the first separator 40 and the grooves 41f of the second separator 41 in each of the fuel cells 39. (See FIGS. 14 and 15.) An excess amount of the supplied hydrogen gas is discharged from the openings formed in the second endplate 38B. As has been described for the fuel cell systems YS1–YS3, the discharged hydrogen gas is collected and then re-supplied to the fuel cell stack 38 or used as the fuel for the heating means in the reforming device.

On the other hand, oxygen-containing gas is supplied to the first and the second communicating holes 400a, 400b via the first and the second supply holes 38c, 38d of the first endplate 38A. This delivers the oxygen-containing gas to the grooves 40e of the first separator 40 and the grooves 41e of the second separator 41 in each fuel cell 39. Normally, the oxygen-containing gas is supplied as air.

Referring now to FIG. 15, hydrogen gas supplied to the grooves 40f of the first separator 40 passes through the negative-electrode collector 43, and then is dissociated into hydrogen ions and electrons at the negative-electrode catalyzer portion 42A. The electrons are collected in the negative-electrode collector 43. Thereafter, the electrons are supplied, via the first separator 40, to the positive-electrode collector of the adjacent fuel cell on the left which uses said separator in common.

On the other hand, the hydrogen ions produced by the reaction at the negative-electrode catalyzer potion 42A pass through the ion exchange film 42 to the positive-electrode catalyzer portion 42B. The positive-electrode catalyzer portion 42B is also supplied with electrons from the negative-electrode collector of the adjacent fuel cell on the right which uses the separator 41 in common.

The oxygen-containing gas supplied to the grooves 41e of the second separator 41 is supplied to the positive-electrode catalyzer portion 42B via the positive-electrode collector 44. In this way, the positive-electrode catalyzer portion 42B is supplied with oxygen gas, electrons and hydrogen ions. These substances react to produce water.

As described above, the electrons collected in the negative-electrode collector 43 of each fuel cell 39 are supplied to the positive-electrode collector of the adjacent fuel cell. Electrons collected in the negative-electrode collector 43 of the fuel cell located at the most downstream of electron flow are supplied to the positive-electrode collector of the fuel cell located at the most upstream of the electron flow via an external circuit. In other words, in the fuel cell stack 38, the electrons flow in one direction as a whole, with the electrons circulated from the most downstream fuel cell to the most upstream fuel cell via the external circuit. Energy generated is tapped and used by an external circuit.

Figure 16:
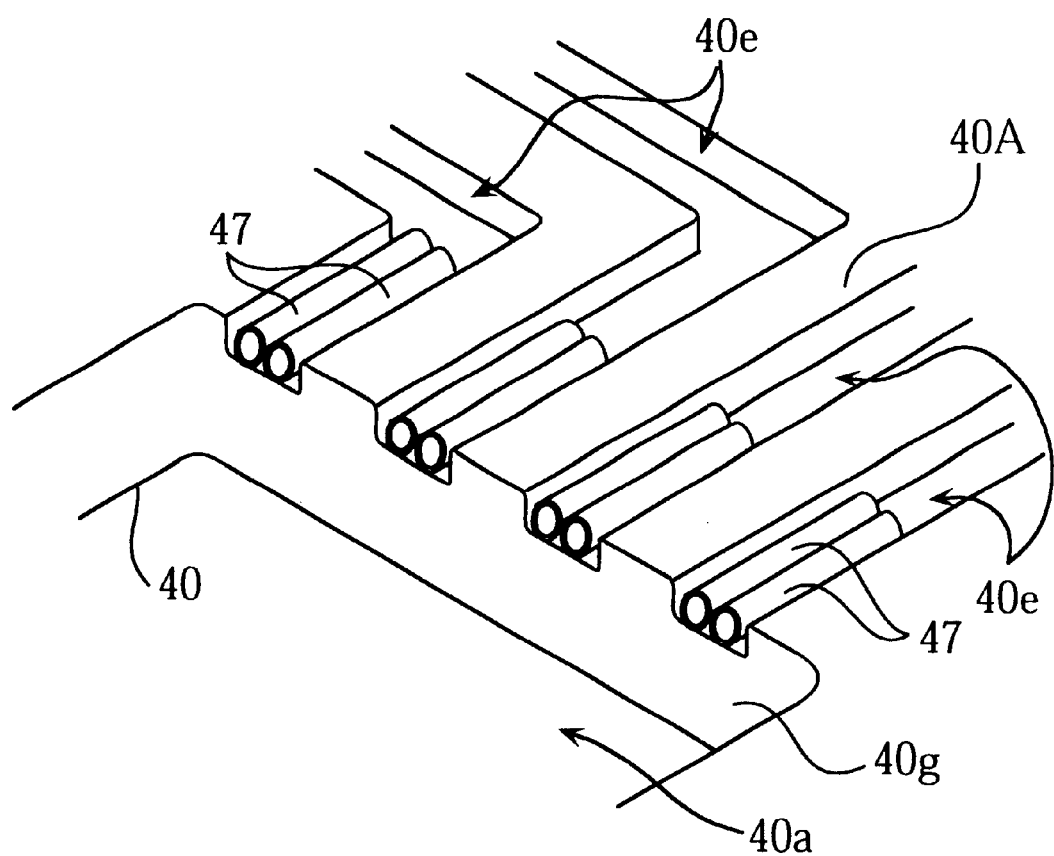
FIG. 16 is a diagram illustrating a surface-pressure assuring member used in the fuel cell stack.

Next, reference is made to FIG. 16. This figure shows a primary portion (a region near the first through hole 40a) of the first surface 40A of the first separator 40. As shown in the figure, an end of each grooves 40e opens to the first through hole 40a. Each end of these grooves 40e is provided with a pipe-like surface-pressure assuring members 47. Each of the surface-pressure assuring members 47 is bonded to the bottom face of the grooves 40e, with its end generally flush with a surface 40g of the through hole 40a. The other end portion (opening to the second through hole 40b) of each groove 40e is also provided with the surface-pressure assuring members. These surface-pressure assuring members 47 assure that the first separator 40 presses the gasket that contacts the first surface 40A of said separator at a sufficient surface pressure.

Figure 17:
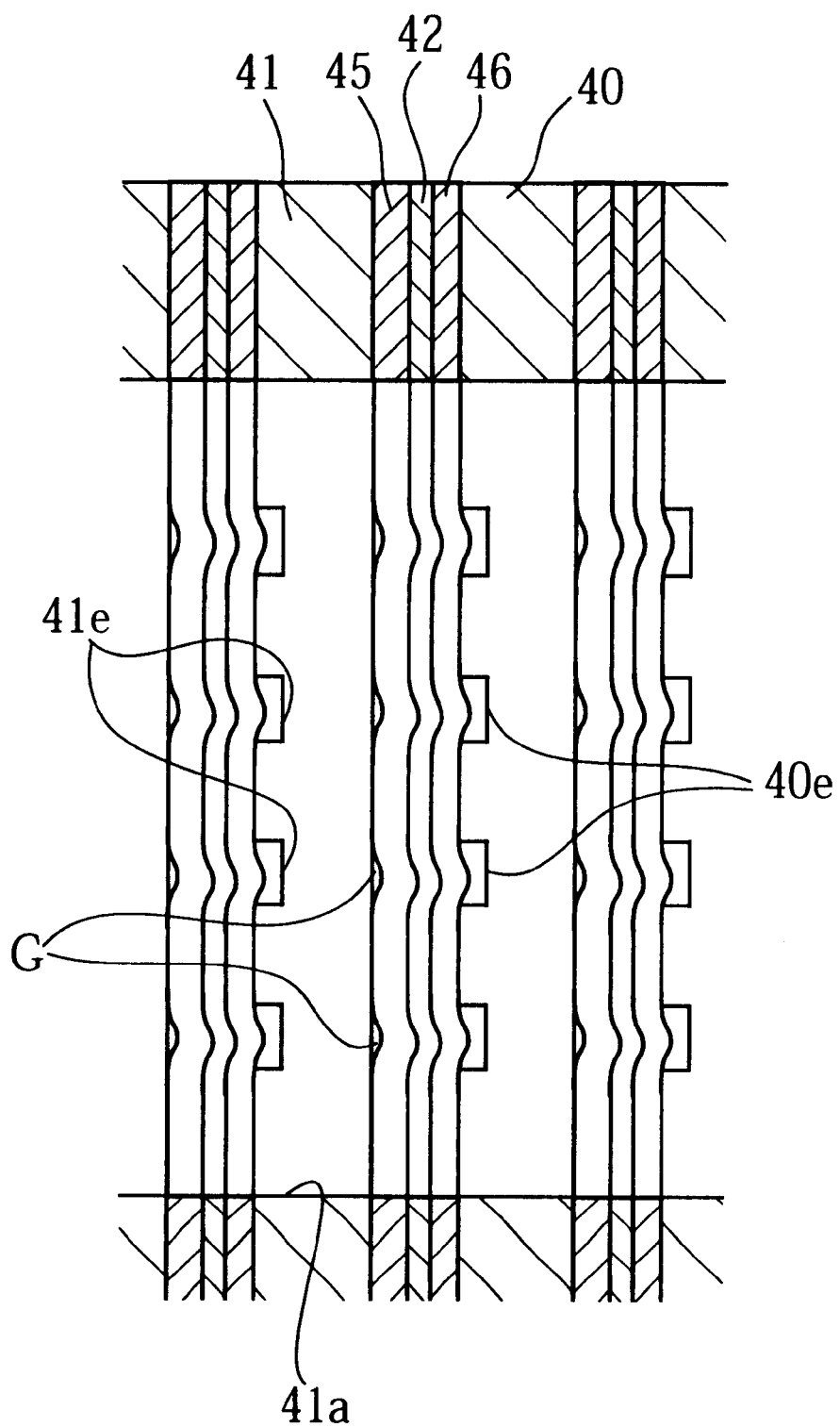
FIG. 17 is a diagram illustrating a problem caused by absence of the surface-pressure assuring members.

Effect of using the surface-pressure assuring members as mentioned above will be described now in more detail, with reference to FIG. 17. This figure illustrates disadvantages of not using the surface-pressure assuring members. Attention is now made to the grooves 40e of the first separator 40. These grooves 40e are not provided with the surface-pressure assuring members. Therefore, when the laminated fuel cells are being fixed together by the bolts and nuts, the second gasket 46 can be deformed and warped into the grooves 40e. This can also deform the ion exchange film 42 and the first gasket 45 as shown in the figure. As a result, a gap G can develop between the first gasket 45 and the second separator 41. If sealing between the first gasket 45 and the second separator 41 is deteriorated as above, supplied oxygen-containing gas can leak into the grooves 41e of the second separator 41 via the gap G, or supplied hydrogen gas can leak into the first through hole 41a of the second separator 41 via the gap G, resulting in a trouble that the fuel cell stack does not operate properly.

This problem can be solved appropriately by disposing the surface-pressure assuring members 47 in the grooves 40e as shown in FIG. 16. Though not illustrated in the figure, same surface-pressure assuring members are disposed in the grooves 40f formed in the second surface 40B of the first separator 40. These surface-pressure assuring members in the grooves 40f are placed near the third through hole 40c or the fourth through hole 40d of the first separator 40. Likewise, the surface-pressure assuring members are provided in the grooves 41e and the grooves 41f formed in the second separator 41. These surface-pressure assuring members in the second separator 41 are placed near one of the first through hole 41a through the fourth through hole 41d of the second separator 41.

Figure 18:
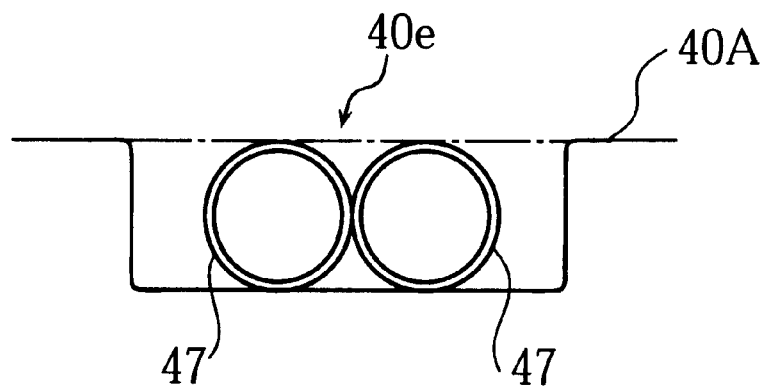
FIG. 18 is a side view showing a disposition example of the surface-pressure assuring members.

Each of the surface-pressure assuring members 47 is made of a metal such as stainless steel and titanium. As shown in FIG. 18, an outer diameter of the surface-pressure assuring member 47 is generally equal to a depth of the grooves 40e. Specifically, if the depth of the grooves 40e is 80 μm, the outer diameter of the surface-pressure assuring member 47 is 80±10 μm. The illustrated surface-pressure assuring member 47, which is tubular, makes little obstruction to the flow of gas supplied to the grooves 40e.

Figure 19:
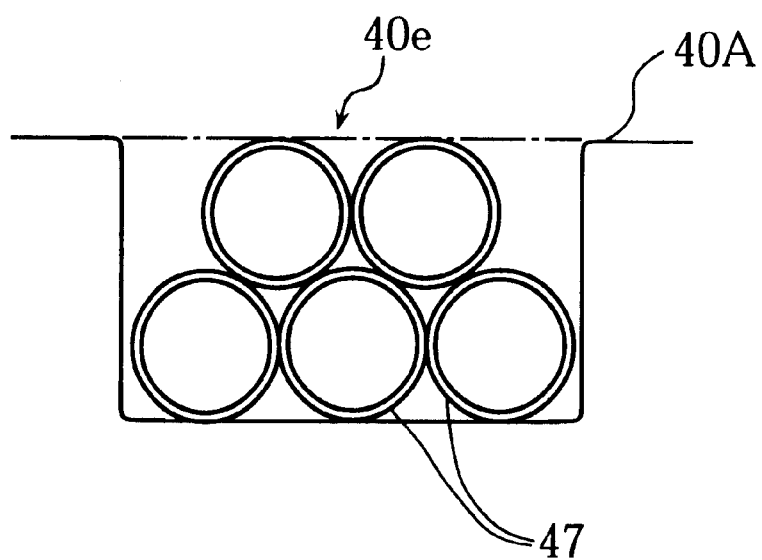
FIG. 19 is a side view showing another disposition example of the surface-pressure assuring members.
Figure 20:
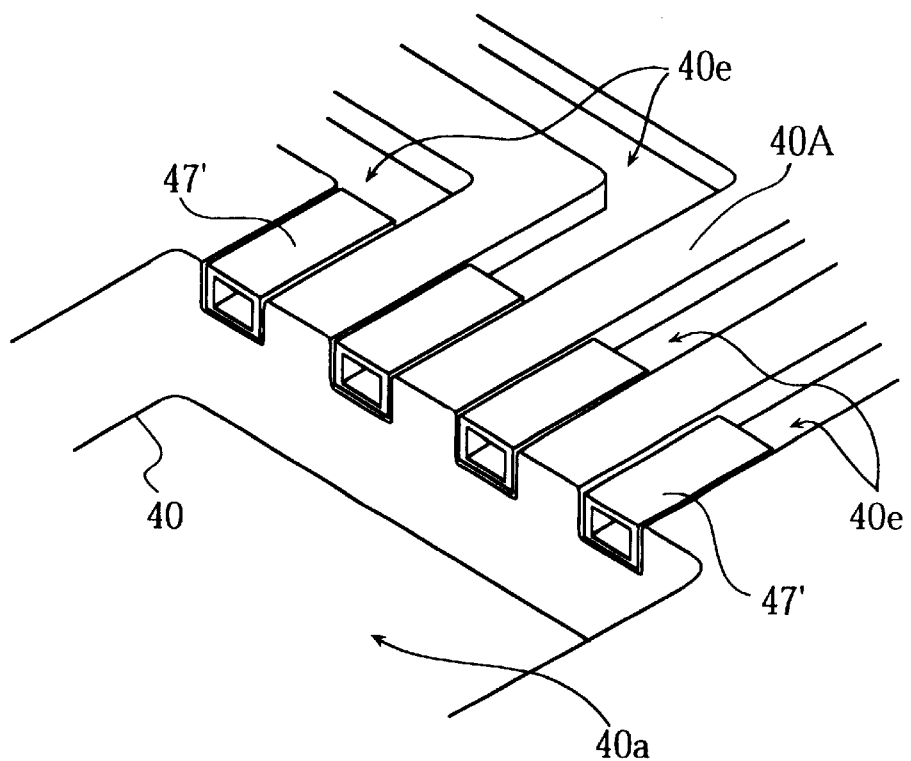
FIG. 20 is a perspective view showing another example of the surface-pressure assuring members used in the fuel cell stack.
Figure 21:
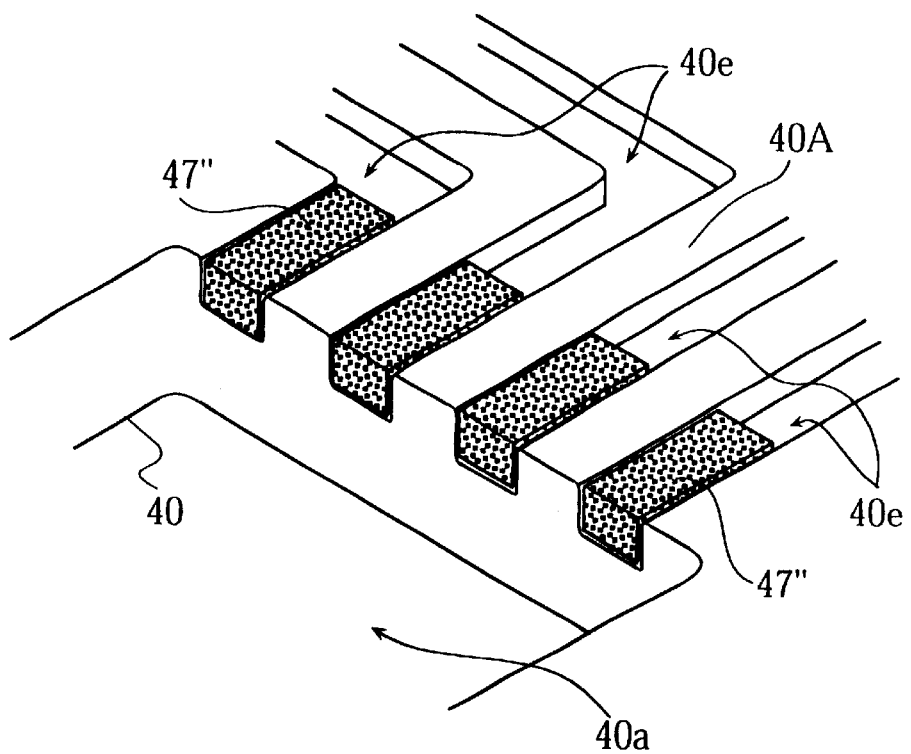
FIG. 21 is a perspective view showing still another example of the surface-pressure assuring members used in the fuel cell stack.

In FIG. 18, two tubular surface-pressure assuring members 47 are disposed in each of the grooves 40e. However, the present invention is not limited to this. For example, as shown in FIG. 19, five surface-pressure assuring members 47 may be disposed in the grooves 40e. Alternatively, as shown in FIG. 20, rectangular parallelepiped hollow members 47' may be used. Still alternatively, as shown in FIG. 21, rectangular parallelepiped gas-permeable porous block 47" may be used. The porous block 47" can be suitably selected from foam materials made of a metal or ceramic which contains foams mutually connected with each other, or made of sintered metal powder. The porous member 47" has a thickness generally equal to the depth of the grooves 40e.

Figure 22:
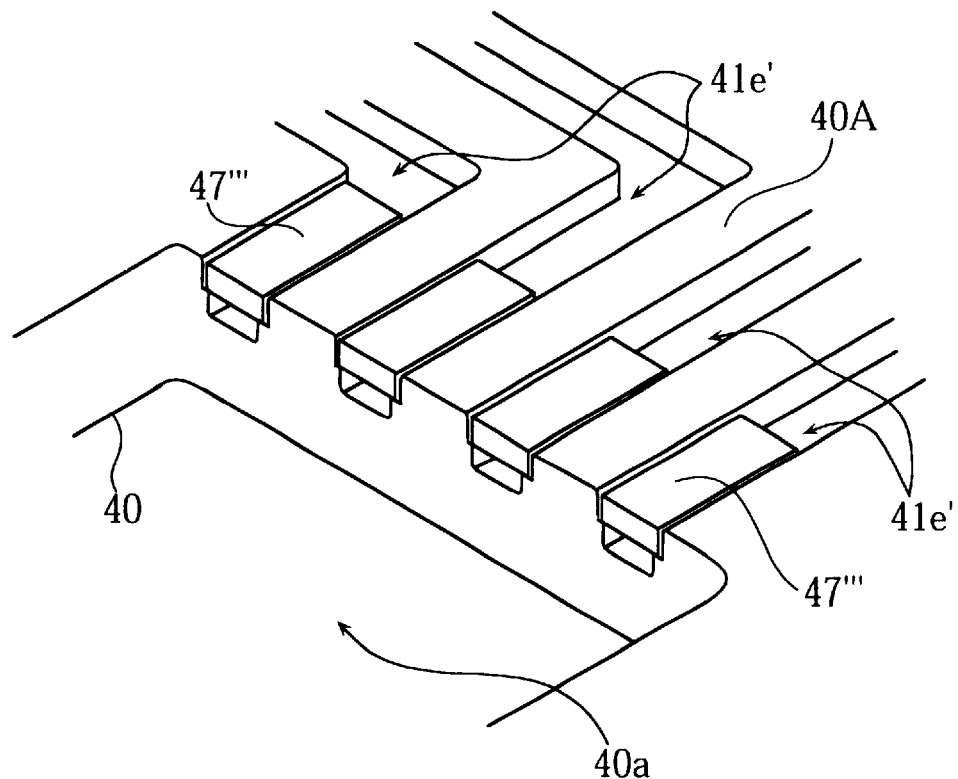
FIGS. 22 and 23 are views showing still another example of the surface-pressure assuring members used in the fuel cell stack.
Figure 23:
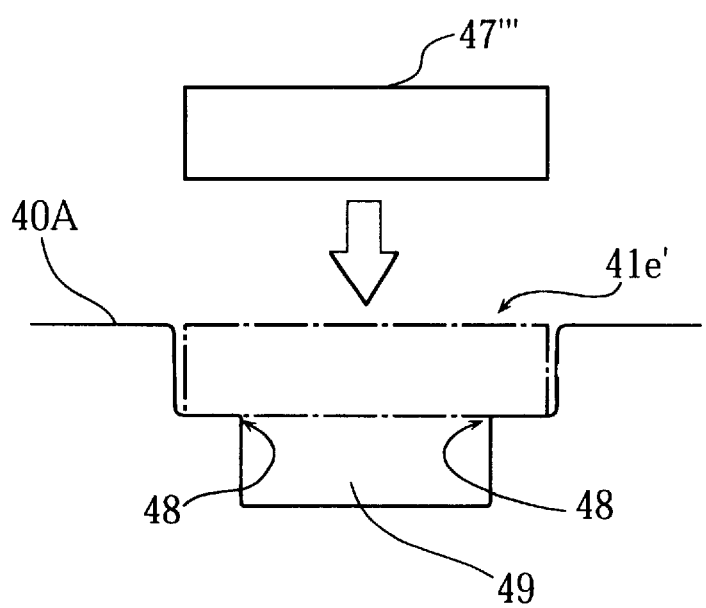

FIGS. 22 and 23 show an alternative mode of providing the surface-pressure assuring members in the grooves 41e' of the first separator 40. As clearly shown in FIG. 23, each of the grooves 41e' has a stepped portion 48. Each of the surface-pressure assuring members 47''' is a plate-like member. As shown in FIG. 23, each of the surface-pressure assuring members 47''', is bonded to a corresponding stepped portion 48 of the grooves 41e'. According to this arrangement, in each of the grooves 41e', a passage 49 is formed below the surface-pressure assuring member 47''', and necessary hydrogen gas (or oxygen-containing gas) can be supplied via the passage 49. Therefore, each of the surface-pressure assuring members 47''' may be made of a material not permeable by the supplied gas. In this case, the surface-pressure assuring members 47''' can be solid, and made of a metal or plastic material. However, in order to improve the flow of supplied gas, each of the surface-pressure assuring members 47''' should be formed as a hollow member or made of a foam material.

As has been described above, according to the fuel cell stack 38 shown in FIG. 13, both of the hydrogen gas and oxygen-containing gas are introduced from the supply ports (38c–38f) provided in the first endplate 38A, and discharged from the openings provided in the second endplate 38B. The present invention is not limited to this, however. For example, the hydrogen gas may be introduced from the openings provided in the second endplate 38B and discharged from the openings provided in the first endplate 38A.

Next, reference is made to FIGS. 24–28. These figures show another example of the fuel cell stack usable in the fuel cell system SY1–SY3 described above.

Figure 24:
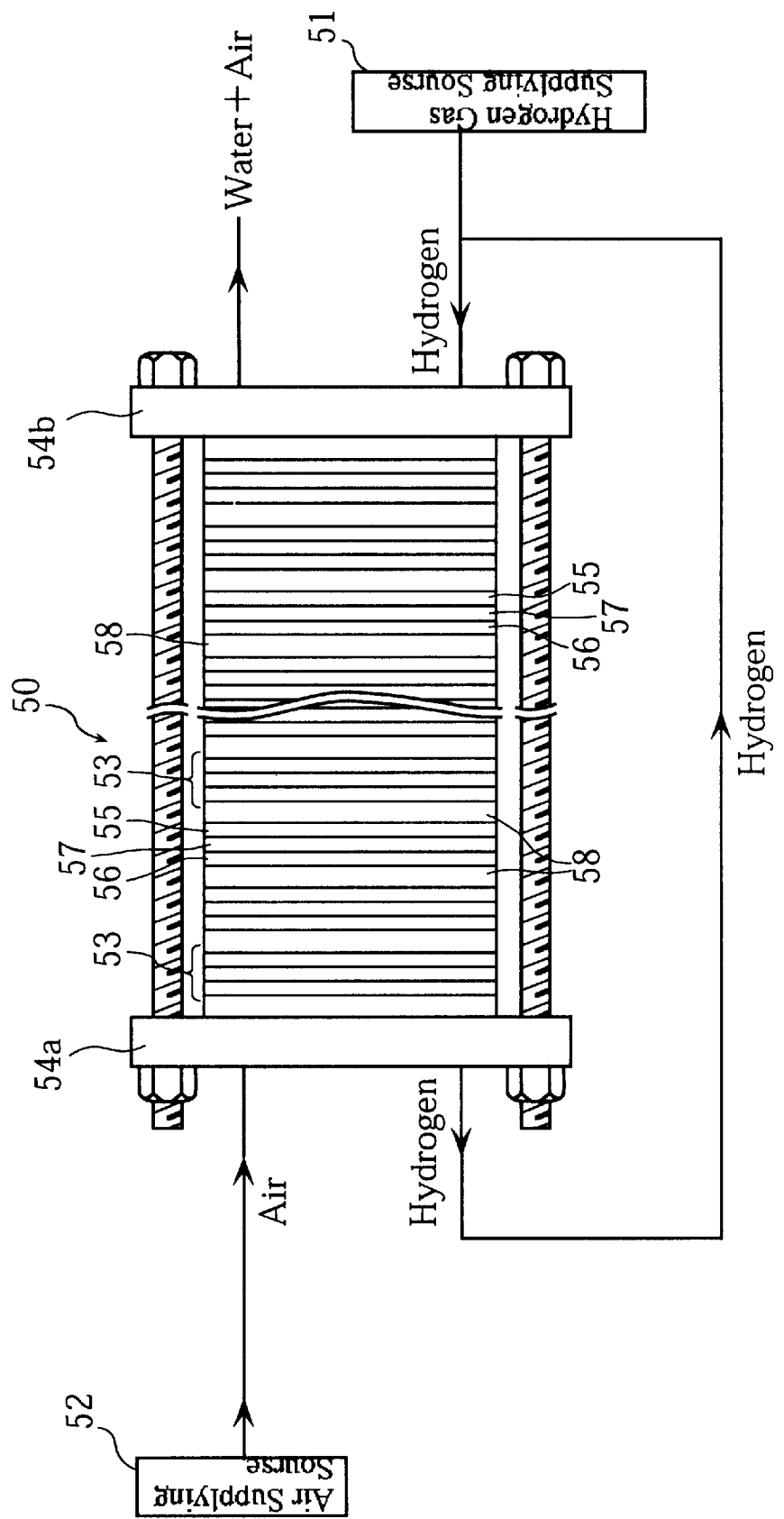
FIG. 24 is a side view showing another example of the fuel cell stack used in the fuel cell system according to the present invention.

As shown in FIG. 24, this fuel cell stack (the entire fuel cell stack is indicated by numeral 50) receives hydrogen gas (fuel gas) from a hydrogen gas supplying source 51, and air (oxygen-containing gas) from an air supplying source 52.

As shown in FIG. 24, the fuel cell stack 50 comprises a plurality of fuel cells 53 laminated in series. These fuel cells 53 are sandwiched between a pair of endplates 54a, 54b by using plural pairs of bolts and nuts.

Figure 25:
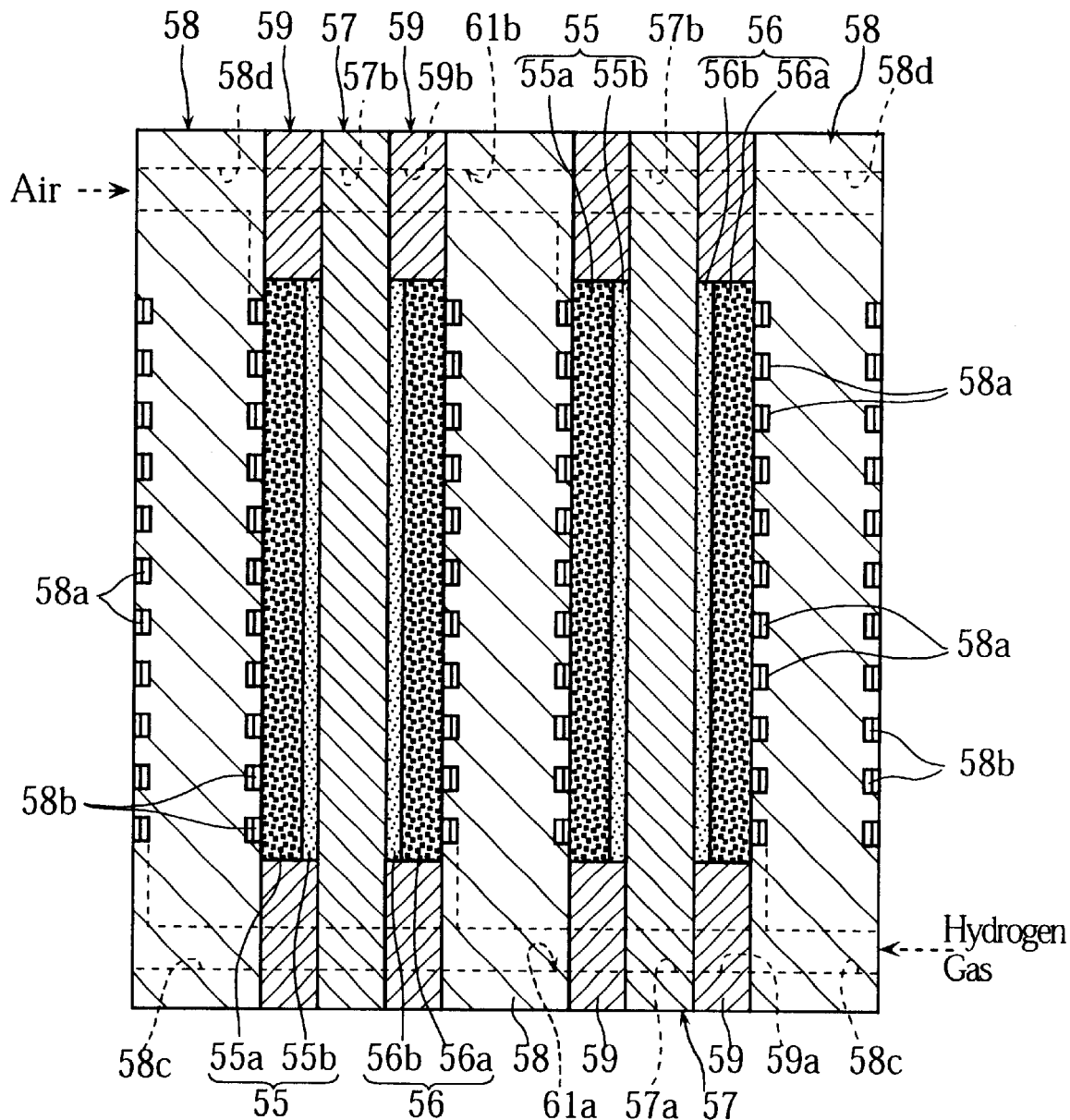
FIG. 25 is a sectional view of a primary portion of the fuel cell stack in FIG. 24.
Figure 26:
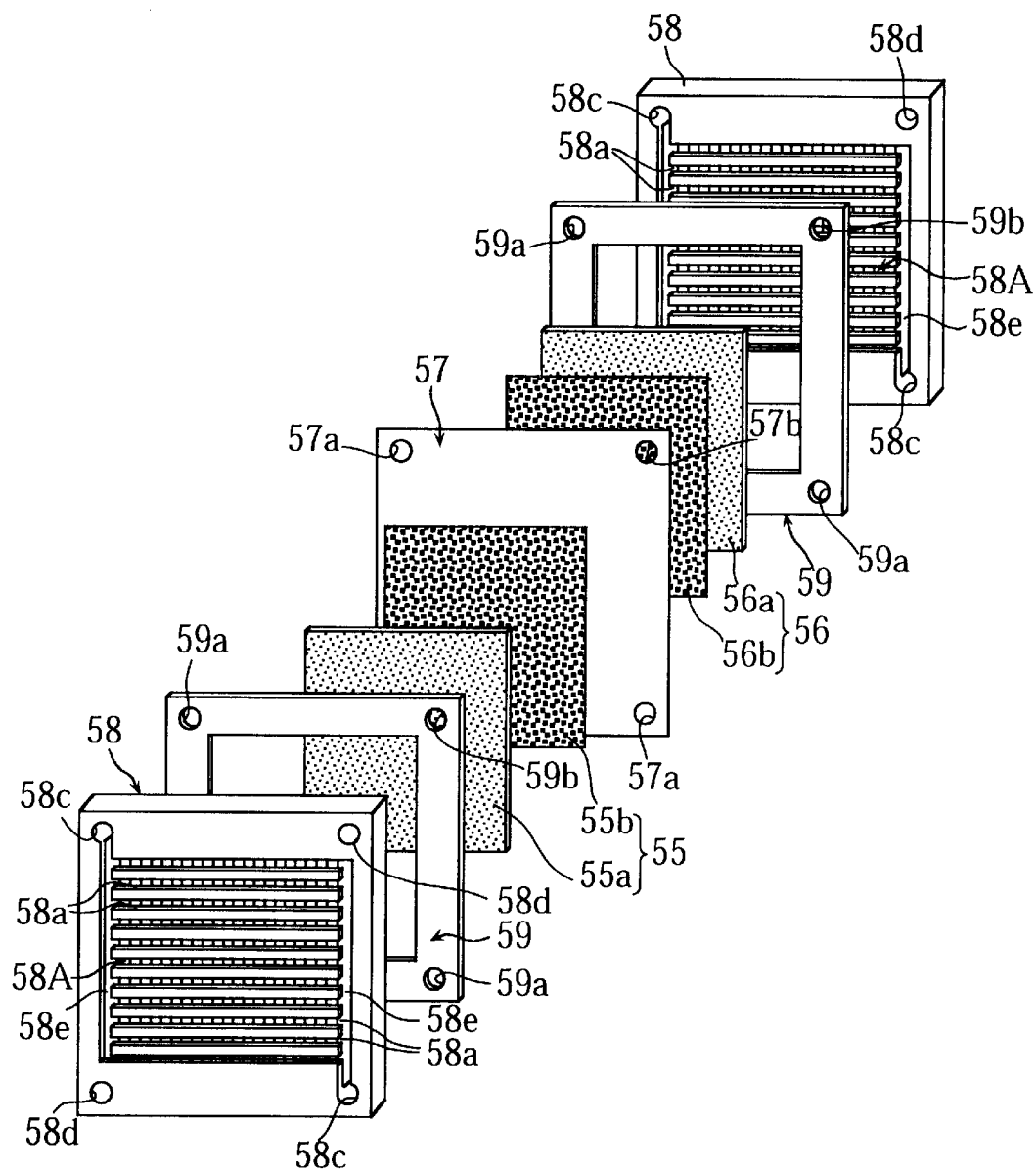
FIG. 26 is an exploded view of the fuel cell stack in FIG. 24.

As shown in FIG. 25 and FIG. 26, each of the fuel cells 53 has a positive-electrode portion 55, a negative-electrode portion 56, and an electrolyte portion 57 sandwiched between two separators 58. Mutually adjacent fuel cells 53 use one separator 58 in common. The electrolyte portion 57 is a so called solid high polymer type in which a solid high polymer film is used as the electrolyte. As the solid high polymer film, a polystyrene cation exchange film (made of perfluorosulfonic acid polymer for example) is suitably used. This polymer becomes proton conductive when moistened with water. Therefore, protons dissociated from hydrogen gas at the negative-electrode portion 56 can pass the electrolyte portion 57 under a hydrated state to move to the positive-electrode portion 55.

Each positive-electrode portion 55 includes a collector 55a and a catalyzer layer 55b. Each negative-electrode portion 56 includes a collector 56a and a catalyzer layer 56b. The collectors 55a, 56a are formed porous members made of conductive grains. The collector of the positive-electrode portion 55 allows oxygen-containing gas to pass through to the catalyzer layer 55b. Further, the collector 55a supplies the catalyzer layer 55b with electrons. On the other hand, the collector 56a of the negative-electrode portion 56 allows hydrogen gas to pass through to the catalyzer layer 56b. Further, the collector 56a collects electrons produced in the catalyzer layer 56b. For these functions, each of the collectors 55a, 56a must have appropriate porosity and good electron conductivity. In addition, each of the collectors 55a, 56a must have superb mechanical strength and resistance to corrosion by the electrolyte. Materials that meet these requirements include carbon materials (carbon powder such as carbon black, and carbon fibers).

The catalyzer layers 55b, 56b are porous matrices made of carbon grains which support an appropriate catalyzer such as platinum in a form of powder. More specifically, the conductive grains such as carbon grains are first coated with the catalyzer powder, and then formed into the porous matrices of the catalyzer layers 55b, 56b. The catalyzer for the catalyzer layer 56b of the negative-electrode portion 56 can also be made of materials other than platinum, such as ruthenium.

Alternatively, the catalyzer layers 55b, 56b can be formed by first preparing porous matrices made of carbon grains, then submerging the porous matrices into a solution containing the catalyzer component, and then heat-treating the matrices.

As another alternative, the catalyzer layers 55b, 56b may be formed by directly applying the catalyzer substance on a surface of the electrolyte portion 57. In this case, the catalyzer layers 55b, 56b can be formed in the following steps: First, the carbon powder which supports the catalyzer is made into a paste (or a suspension) by adding a solvent. Then, the carbon powder paste is applied onto the electrolyte portion 57 by screen printing for example. Finally, the solvent component is removed from the carbon powder paste by vaporization. In this method, the carbon powder is not necessarily coated with the catalyzer before mixed with the solvent. In other words, the solvent may be added to a mixture of the catalyzer and the carbon powder.

There is still another method of forming the catalyzer layers 55b, 56b using a water-repelling sheet made of a fluororesin for example. In this case, first, a carbon thin film is formed on the water-repelling sheet by screen printing for example. Then, the carbon thin film is thermally printed onto the electrolyte portion 57, to form the catalyzer layers 55b, 56b.

Each of the positive-electrode portion 55 and the negative-electrode portion 56 has perimeters surrounded by the gasket 59. Each of the gaskets 59 has four corners each formed with a through hole 59a or a through hole 59b.

The electrolyte portion 57 is made of an ion exchange film having proton conductivity which selectively passes protons (hydrogen ions). The electrolyte portion 57 has four corners each formed with a through hole 59a or a through hole 59b correspondingly to the through holes 59a or 59b of the gasket 59.

Each of the separators 58 is made of a conductive material such as stainless steel and a titanium alloy. As shown in FIG. 25 and FIG. 26, each separator 58 has a surface formed with hydrogen supplying groove pattern 58A. The hydrogen supplying groove pattern 58A includes a plurality of individual linear grooves 58a and two common grooves 58e extending vertically to the individual grooves 58a. The individual grooves 58a communicate with each other via the common grooves 58e. Each of the separators 58 has the other surface formed with an air (oxygen) supplying groove pattern (58B) similarly to the above-described hydrogen supplying groove pattern. The air supplying groove pattern includes a plurality of individual grooves 58b (FIG. 25) and two common grooves (58f) extending vertically to the individual grooves 58b providing mutual communication among the individual grooves. Each separator 58 has four corners each formed with a through hole 58c or 58d correspondingly to the through holes 59a or 59b of the gasket 59. Out of these through holes 58c, 58d, the through holes 58c disposed diagonally communicate with the common grooves 58e of the hydrogen supplying groove pattern 58A, whereas the remaining through holes 58d communicate with the common grooves of the air supplying groove pattern.

Figure 27:
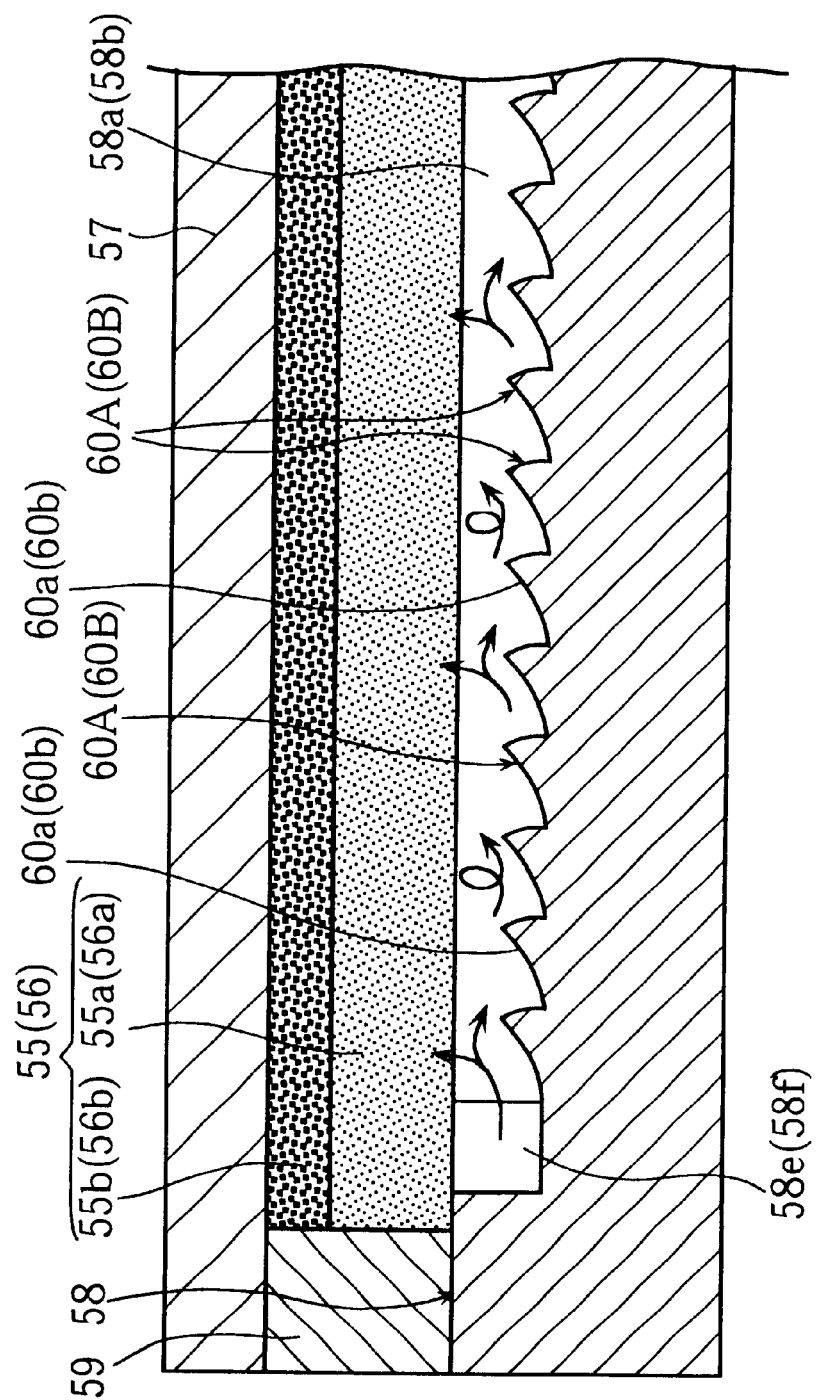
FIGS. 27 and 28 are diagrams illustrating projections provided in a gas supplying groove of the fuel cell stack in FIG. 24.
Figure 28:
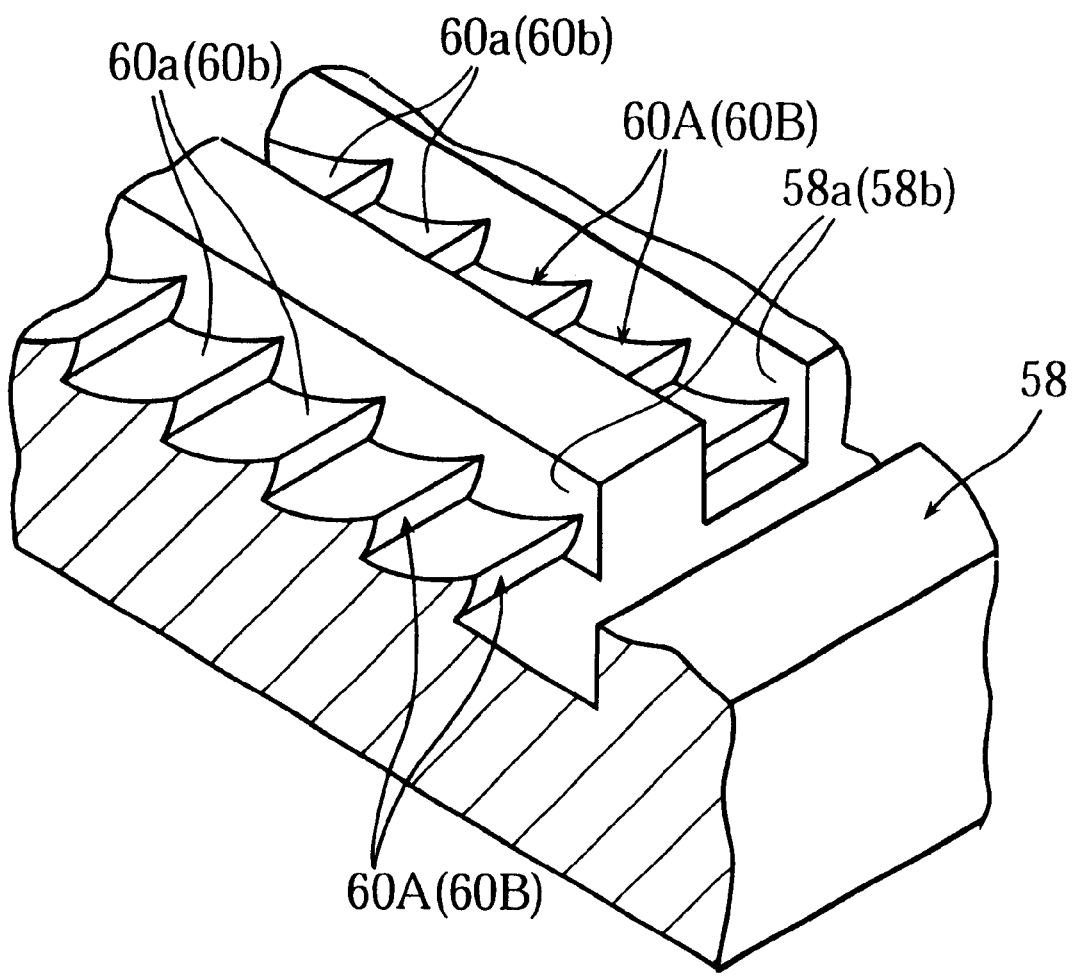

As shown in FIG. 27 and FIG. 28, each of the individual grooves 58a (and 58b) of the hydrogen supplying groove pattern 58A (and the air supplying groove pattern 58B) is formed continuously with projections 60A (60B). These projections 60A (60B) have slopes 60a (60b) for reducing the gas flow in a direction along the groove 58a (58b).

As shown in FIG. 24, the endplates 54a and 54b are larger than each of the separators 58. Though not illustrated in the figure, each of the endplates 54a and 54b is formed with four openings correspondingly to the through holes 58c, 58d of each separator 58. In an assembled state of the fuel cell stack 50, the through holes 58c and the through holes 58d of each separators 58 communicate with respective through holes of the other separators, forming a hydrogen gas passage 61a or an air passage 61b. (See FIG. 25.) The unillustrated openings in the endplates 54a and 54b communicate with the hydrogen gas passage 61a or the air passage 61b. Supply and discharge of the hydrogen gas and air to and from the fuel cell stack 50 are performed via these openings.

Hydrogen gas supplied from the hydrogen supplying source 51 (FIG. 24) is introduced into the hydrogen gas passage 61a (FIG. 25) and then supplied to the hydrogen supplying groove pattern 58A via the through hole 58d of each separator 58. The hydrogen gas sent to the hydrogen supplying groove pattern 58A is then introduced to individual grooves 58a via the common grooves 58e. On the other hand, air coming from the air supplying source 52 (FIG. 24) is supplied to the air supplying groove pattern 58B of each separator 58 via the air passage 61b. The air sent to the air supplying groove pattern 58B is then introduced to individual grooves 58b via the common grooves 58f.

As shown in FIG. 27, the hydrogen (the air) supplied to each individual grooves 58a (58b) is flown along the individual grooves 58a (58b) while hitting against the slopes 60a (60b) of each projection 60A (60B). The collision with the slopes 60A (60B) shifts the flow of hydrogen (air) toward the collector 55a (56a ). Thereafter, part of the hydrogen (air) diffuses into the collector 55a (56a ) while another part is reflected on the surface of the collector 55a (56a ). As a result, the gas flow in the individual grooves 58a (58b) becomes turbulent, but as a whole, the gas flows along the individual grooves 58a (59b).

As has been described, by providing the projections 60A (60B) in the individual groove 58a (58b), flow of the gas supplied to the individual groove 58a (58b) can be directed toward the collector 55a (55b). As a result, the supplied gas can be diffused efficiently into the collector 55a (56a ). The shape of the projections 46A (46B) is not limited to the example shown in FIG. 27 and FIG. 28, and may be varied in many ways. Specifically, the projection may be prismatic or columnar for example, and further, domelike or needlelike. Further, the projections may be replaced with recesses for causing the turbulent flow of the gas.

As has been described above, part of the hydrogen supplied as the fuel diffuses into the collector 56a. Then, the hydrogen reaches the catalyzer layer 56b, and dissociated into hydrogen ions and electrons. The hydrogen ions pass through the electrolyte portion 57 to reach the catalyzer layer 55b of the positive-electrode portion 55. The electrons pass the collector 56a again to reach the separator 58, and to the catalyzer layer 55b of the positive-electrode portion 55 of the adjacent fuel cell 53.

On the other hand, the air introduced into the air supply groove pattern 58B passes the collector 55a of the positive-electrode portion 55 and reaches the catalyzer layer 55b. Then, oxygen gas in the air which has reached the catalyzer layer 55b reacts with the hydrogen ions coming through the electrolyte portion 57 and the electrons supplied from the adjacent fuel cell 53, to produce water.

The water is partially flown with the air, and discharged from each individual groove 58b of the air supplying groove pattern 58B. The rest of the water condenses in the individual grooves 58b. If the condensed water remains in the individual grooves 58b, the stagnation will prevent appropriate supply of air. Further, if the condensed water remains in the catalyzer layer 55b and/or the collector 55a, sufficient movement and reaction of the oxygen gas at the positive-electrode portion will be prevented.

As means for removing the remaining water, pressure of the air supplied to the air supplying groove pattern may be increased so that the remaining water can be forced out. However, this method is not necessarily preferable because of such a shortcoming as being disadvantageous in terms of the fuel cell system energy efficiency.

In order to address this problem, according to the above-described fuel cell stack 50, the individual groove for supplying air is provided with projections for causing turbulence in the airflow. If the air flow is turbulent, the condensed water is likely to be divided into droplets of a smaller diameter. Further, the condensed water is divided into droplets of a smaller diameter also by collision with the projections. The smaller droplets, having a smaller contact area with the individual groove 58b, are blown more easily by the airflow, and discharged efficiently. As has been described, by providing the projections as shown in FIG. 27 and FIG. 28, the unnecessary water can be advantageously removed from within the fuel cell stack without the need for increasing the pressure of the supplied air.

The water produced in the fuel cell stack 50 can be removed by the above-described method (hereinafter called "a first method") but by other methods, too. Such methods include a method in which a pressure of the oxygen-containing gas supplied to the fuel cell stack is changed intermittently (hereinafter called "a second method"), and a method in which ultrasonic wave is applied to the water remaining in the fuel cell stack (hereinafter called "a third method"). Description will now be made for these second and the third methods.

Figure 29:
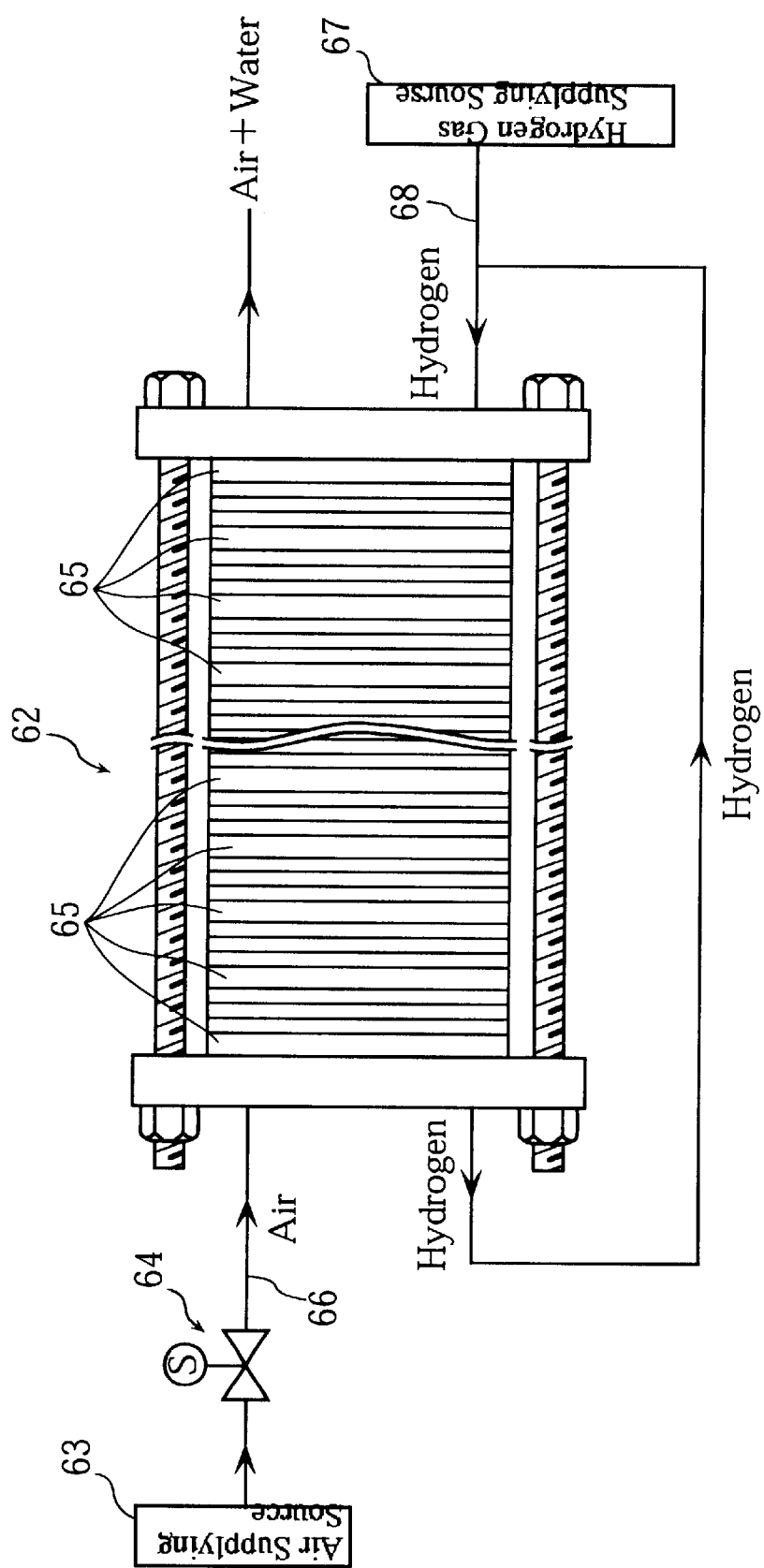
FIG. 29 is a diagram illustrating a method for discharging unnecessary water stagnating within the fuel cell stack.

FIG. 29 illustrates the second method. In order to carry out the second method, an electromagnetic valve 64 is disposed between the fuel cell stack 62 and the air supplying source 63. The air supplying source 63 is for supplying air as the oxygen-containing gas to the fuel cell stack 62, and constituted by a publicly known component such as a compressor.

The fuel cell stack 62 is constituted by a plurality of fuel cells in lamination, and includes a plurality of separators 65 separating each fuel cell from the other. Though not illustrated in the figure, each of the separators 65 is formed with grooves for supplying the air, and grooves for supplying the hydrogen. The fuel cell stack 62 has an internal structure similar to that of the fuel sell stack 38 shown in FIGS. 13–15, or to that of the fuel sell stack 50 shown in FIGS. 24–26. Therefore, the internal structure of the fuel cell stack 62 will not be described here in detail.

The electromagnetic valve 64 is opened and/or closed by electromagnetic force. For example, the valve is opened if the electromagnetic valve 64 is applied with electricity, whereas the valve is closed if not applied with electricity.

Figure 30:
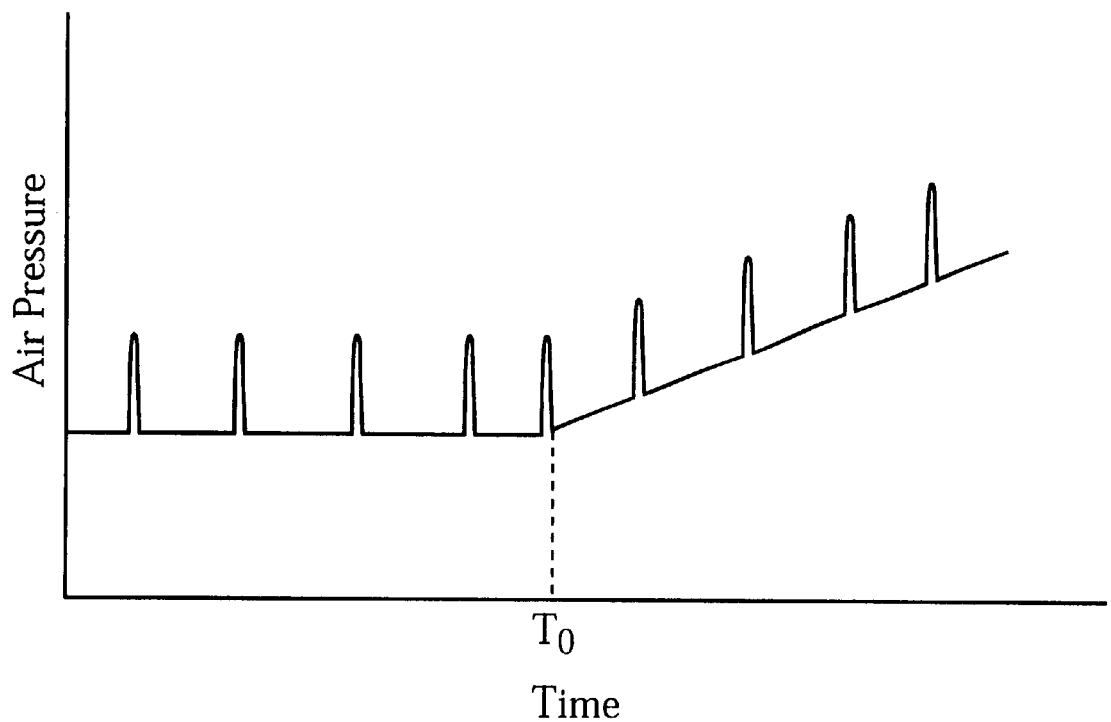
FIG. 30 is a diagram illustrating pressure variation of air supplied to the fuel cell stack sown in FIG. 29.

With the above arrangement, by opening the electromagnetic valve 65, air is supplied from the air supplying source 63 to the fuel cell stack 62 via piping 66. This introduces the air into the air supplying grooves of each separator 65. On the other hand, hydrogen gas from the hydrogen gas supplying source 67 is supplied to the fuel cell stack 62 via piping 68. The hydrogen gas supplied is then introduced to the hydrogen supplying grooves of each separator 65. Reaction between the supplied air and the hydrogen produces water in the air supplying groove of each separator 65. Part of the water is flown by the flow of air and discharged from the fuel cell stack 62, whereas the rest condenses in the air supplying grooves in the separator 65. The condensed water can the removed by the following method:

As has been described above, the electromagnetic valve 64 controlling the supply of air is provided between the air supplying source 63 and the fuel cell stack 62. Here, the air is constantly supplied from the air supplying source 63 while the fuel cell stack 62 is operating. In such a case, if the electromagnetic valve 64 is operated, the flow of air being supplied is blocked in the piping 66. As a result, pressure of the air becomes greater than when the electromagnetic valve 64 is not operated. This means that by repeating intermittent closing and opening of the electromagnetic valve 5, the pressure of the air supplied to the fuel cell stack 62 can be changed over a period of time. For example, if the electromagnetic valve is closed periodically and momentarily, the pressure of the supplied air changes as shown in FIG. 30. It should be noted that an overall pressure increase after the time to is caused by load variation to the fuel cell stack 62.

By raising the pressure of the air momentarily at a predetermined time interval as described above, intermittent propelling force can be given to the water remaining in the air supplying groove of each separator 65. This makes possible to efficiently remove the remaining water from within the fuel cell stack 62. Further, since the method is not to supply the remaining water with a constant high pressure (removing force), energy used for the water removal can be small. Therefore, it becomes possible to efficiently avoid output decrease of the fuel cell stack 62 caused by the remaining water, without particularly reducing an overall energy efficiency as a system which uses the fuel cell stack 62.

According to the above example, the open/close operation of the electromagnetic valve is performed at a regular interval. However, the present invention is not limited to this. For example, electric output from the fuel cell stack 62 may be monitored, and the electromagnetic valve 64 may be operated on the basis of the output value. Specifically, the pressure of the supplied air is increased when the outputted electricity becomes lower than a predetermined value. Further, if the removal of the remaining water is possible, the pressure of the supplied air may be changed in a sine carve pattern.

Alternatively, the means for intermittently raising the pressure of the air supplied to the fuel cell stack 62 may be a pulsation pump as shown in FIG. 31. Specifically, the air from the air supplying source 63 may be sent by the pulsation pump under pressure. In this case, the electromagnetic valve 64 may not necessarily be used.

Next, reference is made to FIG. 32. This figure illustrates the third method for removing unnecessary remaining water in the fuel cell stack 62. The third method differs from the second method in that a supersonic generator 70 is used instead of the electromagnetic valve 64 (FIG. 29). As shown in the figure, the supersonic generator 70 is disposed on the piping 66 for supplying air to the fuel cell stack 62.

According to th e above arrangement, by operating the supersonic generator 70, a high frequency vibration can be given to the air supplied to the fuel cell stack 62. The vibration is transmitted to the water remaining in the fuel cell stack 62 via the air, causing the remaining water to vibrate. As is publicly known, if supersonic vibration is given to a water droplet attaching to a surface of a substance, the water droplet slips more easily on the surface. According to this principle, the remaining water in the fuel cell stack 62 becomes more apt to slip on the air supplying groove of each separator 65. Thus, the remaining water is easily discharged from the fuel cell stack 62, with the air flowing in the fuel cell stack 62. According to this method, the remaining water can be efficiently removed from the fuel cell 62 without the need for particularly increasing the pressure of the air supplied to the fuel cell stack 62.

The application of the supersonic vibration to the remaining water may be continuous while the fuel cell stack 62 is in operation, or may be intermittent. If the application of the supersonic vibration is made intermittently, the application may be made regularly at a certain time interval, or irregularly in accordance with the electric output from the fuel cell stack 62. In the example shown in FIG. 32, the supersonic generator 70 is provided on the piping 66, but the present invention is not limited to this. For example, the supersonic generator 70 may be provided on the fuel cell stack 62.

The present invention having been thus far described as above, it is obvious that the present invention can be varied in many ways. These variations should not be interpreted as deviation from the sprit and scope of the present invention, but rather, any such variations obvious to those knowledgeable in the art should be included in the accompanied claims to follow.

What is claimed is:

1. A fuel cell system comprising:
   a plurality of fuel cell stacks each including a plurality of fuel cells in lamination;
   supply means for supplying a fuel and an oxidizing agent to each of the fuel cell stacks; and
   operation control means for controlling operation of the fuel cell stacks:
      wherein the fuel cell stacks are divided into a plurality of groups including at least a first and a second groups, the operation control means being arranged to operate and stop the fuel cell stacks of the first group independently of the fuel cell stacks of the second group.

2. The fuel cell system according to claim 1, wherein the operation control means is arranged to operate and stop each of the plurality of fuel cell stacks independently of the other fuel cell stacks.

3. The fuel cell system according to claim 1, further comprising piping for supplying the fuel to each of the fuel cell stacks, and a plurality of valves provided on the piping; the valves being arranged to supply and to stop the supply of the fuel to fuel cell stacks, each of the valves being provided correspondingly to one of the plurality of groups.

4. The fuel cell system according to claim 3, wherein the operation control means controls open/close operation of the plurality of valves in accordance with an amount of electricity needed.

5. The fuel cell system according to claim 1, further comprising output control means provided with at least a pair of output terminals for receiving electricity from the fuel cell stacks and for outputting the electricity to an external component, the output control means being arranged to change a mutual connecting pattern among the fuel cell stacks, and a connecting pattern of the fuel cell stacks to the output terminals.

6. An electric car comprising:
   a drive motor; and
   a fuel cell system according to claim 1, for supplying electricity to the drive motor.

7. A fuel cell system comprising;
   reforming device for producing a hydrogen-rich fuel-gas mixture by reforming dimethyl ether;
   a fuel cell supplied with the fuel gas and an oxygen-containing gas, thereby causing a reaction between hydrogen gas and oxygen gas to produce electric energy and water; and
   non-reacted gas supplying means connected to the fuel cell for reusing non-reacted gas obtained from the fuel cell;
   wherein the reforming device includes a steam generating portion for vaporization of water, and a fuel reforming portion for performing steam reformation of the dimethyl ether, the dimethyl ether being heated, before the dimethyl ether is introduced into the fuel reforming portion, by heat generated at the steam generating portion, wherein non-reacted gas supplying means are connected to the steam generating portion so that the non-reacted gas obtained from the fuel cell is used for the heating of the dimethyl ether.

8. The fuel cell system according to claim 7, further comprising a thermally conductive hollow member disposed in the steam generating portion, the dimethyl ether being introduced into the fuel reforming portion via the hollow member.

9. A fuel cell system comprising:
   a fuel cell;
   a hydrogen supplying source for supplying hydrogen gas to the fuel cell;
   an oxygen-containing-gas supplying source for supplying an oxygen-containing gas to the fuel cell; and
   water removing means for intermittently promoting removal of water remaining in the fuel cell,
   wherein the water removing means is a supersonic generator.

10. The fuel cell system according to claim 9, wherein the fuel cell includes: a negative-electrode portion; a positive-electrode portion; an electrolyte portion disposed between the negative-electrode portion and the positive-electrode portion; a first plate disposed adjacent to the negative-electrode portion; and a second plate disposed adjacent to the positive-electrode portion; the first plate being provided with a hydrogen supplying groove for supplying the hydrogen gas to the negative electrode-portion, the second plate being provided with an oxygen supplying groove for supplying the oxygen-containing gas to the positive-electrode portion.

11. The fuel cell system according to claim 9, wherein the supersonic generator provides a supersonic vibration to the oxygen-containing gas supplied to the fuel cell.

12. A fuel cell comprising:
   at least one electrode portion having a first surface and a second surface;
   an electrolyte portion adjacent to the first surface;
   a plate adjacent to the second surface and formed with a gas supplying groove for supply of a gas; and
   surface-pressure assuring means arranged in the gas supplying groove for assuring a surface pressure to the electrode portion;
   wherein the plate is provided with a through hole communicating with the gas supplying groove, the surface-pressure assuring means being partially exposed to the through hole; and
   wherein the surface-pressure assuring means includes a gas-permeable porous member, the porous member having a thickness substantially equal to a depth of the gas supplying groove.

13. A fuel cell comprising:
   at least one electrode portion having a first surface and a second surface;
   an electrolyte portion adjacent to the first surface;
   a plate adjacent to the second surface and formed with a gas supplying groove for supply of a gas; and surface-pressure assuring means arranged in the gas supplying groove for assuring a surface pressure to the electrode portion;

wherein the plate is provided with a through hole communicating with the gas supplying groove, the surface-pressure assuring means being partially exposed to the through hole; and wherein the gas supplying groove is provided with a stepped portion for supporting the surface-pressure assuring means.

14. A fuel cell system comprising:

a reforming device for producing a hydrogen-rich gas mixture by reforming a hydrogen-containing compound, a fuel cell for generating electromotive force by a reaction between hydrogen and oxygen; and a hydrogen separating device disposed between the reforming device and the fuel cell, the hydrogen separating device including a common chamber and hydrogen permeating means for obtaining a fuel gas by separating hydrogen gas from the gas mixture;

wherein the hydrogen permeating means includes solid high-polymer hollow filaments each having a first end and an opposite second end, the first ends of the respective filaments being closed, the second ends of the respective filaments being open to the common chamber.

15. The fuel cell system according to claim 14, further comprising circulating means for supplying non-reacted gas discharged from the fuel cell, to the fuel cell as fuel gas.

16. The fuel cell system according to claim 14, wherein the hydrogen-containing compound is one of ethanol, methanol, dimethyl ether, propane and natural gas.

17. The fuel cell system according to claim 14, wherein the solid high-polymer hollow filaments are made of polyimide.

18. The fuel cell system according to claim 14, wherein the reforming device includes: a steam generating portion for vaporization of water by heating; a combusting portion for heating the steam generating portion by burning a fuel; and a reforming portion for producing the hydrogen-rich gas mixture by reacting steam generated by the steam generating portion with the hydrogen-containing compound; the combusting portion using as a fuel the gas mixture from which hydrogen is separated by the hydrogen separating device.

19. The fuel cell system according to claim 14, comprising a fuel cell stack including the fuel cell and at least an additional fuel cell laminated on the fuel cell.

20. A separator used in a fuel cell stack, the fuel cell stack comprising laminated fuel cells, the separator comprising:

a through hole for allowing passage of a supplied gas;

a gas supplying groove communicating with the through hole; and a surface-pressure assuring means disposed in the gas supplying groove, the surface-pressure assuring means being partially exposed to the through hole;

wherein the surface-pressure assuring means includes a gas-permeable porous member, the porous member having a thickness substantially equal to a depth of the gas supplying groove.

21. A separator used in a fuel cell stack, the fuel cell stack comprising laminated fuel cells, the separator comprising:

a through hole for allowing passage of a supplied gas;

a gas supplying groove communicating with the through hole; and a surface-pressure assuring means disposed in the gas supplying groove, the surface-pressure assuring means being partially exposed to the through hole;

wherein the gas supplying groove is provided with a stepped portion for supporting the surface-pressure assuring means.

* * * * *